United States Patent
Isahaya et al.

(10) Patent No.: US 9,701,788 B2
(45) Date of Patent: Jul. 11, 2017

(54) METHOD FOR PRODUCING BRANCHED AROMATIC POLYCARBONATE RESIN

(71) Applicant: MITSUBISHI GAS CHEMICAL COMPANY, INC., Tokyo (JP)

(72) Inventors: Yoshinori Isahaya, Tokyo (JP); Atsushi Hirashima, Tokyo (JP); Hidefumi Harada, Tokyo (JP); Maki Ito, Tokyo (JP); Jun-ya Hayakawa, Tokyo (JP); Takehiko Isobe, Tokyo (JP); Taichi Tokutake, Tokyo (JP); Yousuke Shinkai, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 281 days.

(21) Appl. No.: 14/420,543

(22) PCT Filed: Aug. 7, 2013

(86) PCT No.: PCT/JP2013/071318
§ 371 (c)(1),
(2) Date: Feb. 9, 2015

(87) PCT Pub. No.: WO2014/024904
PCT Pub. Date: Feb. 13, 2014

(65) Prior Publication Data
US 2015/0232613 A1    Aug. 20, 2015

(30) Foreign Application Priority Data
Aug. 10, 2012 (JP) .................. 2012-178101

(51) Int. Cl.
*C08G 64/06* (2006.01)
*C08G 64/14* (2006.01)
*C08G 63/00* (2006.01)

(52) U.S. Cl.
CPC .................. *C08G 64/14* (2013.01)

(58) Field of Classification Search
CPC ...................... C08G 64/307; C08G 64/06
USPC ........................ 528/196, 198, 500
See application file for complete search history.

(56) References Cited

U.S. PATENT DOCUMENTS

| 4,562,242 | A | 12/1985 | Mark et al. |
| 5,143,997 | A | 9/1992 | Endo et al. |
| 5,418,316 | A | 5/1995 | Kuehling et al. |
| 5,525,670 | A | 6/1996 | Nishi et al. |
| 5,527,879 | A | 6/1996 | Nakae et al. |
| 5,932,683 | A | 8/1999 | Hachiya et al. |
| 6,423,813 | B1 | 7/2002 | Funakoshi et al. |
| 6,437,083 | B1 | 8/2002 | Brack et al. |
| 8,674,053 | B2 | 3/2014 | Isahaya et al. |
| 2007/0037957 | A1* | 2/2007 | Bruchmann ....... C08G 64/0216 528/196 |
| 2013/0317182 | A1 | 11/2013 | ISAHAYA et al. |

FOREIGN PATENT DOCUMENTS

| JP | 52-36159 | 9/1977 |
| JP | 3-220233 | 9/1991 |
| JP | 5-202180 | 8/1993 |
| JP | 5-271400 | 10/1993 |
| JP | 5-271615 | 10/1993 |
| JP | 5-295101 | 11/1993 |
| JP | 6-99552 | 12/1994 |
| JP | 7-18069 | 1/1995 |
| JP | 8-12925 | 1/1996 |
| JP | 2674813 | 7/1997 |
| JP | 3102927 | 8/2000 |
| JP | 2000-290364 | 10/2000 |
| JP | 3249825 | 11/2001 |
| JP | 3997424 | 8/2007 |
| JP | 4598958 | 10/2010 |
| TW | 593538 B | 6/2004 |
| WO | 2011/062220 | 5/2011 |
| WO | 2012/005251 | 1/2012 |
| WO | 2012/108510 | 8/2012 |

OTHER PUBLICATIONS

Search report from PCT/JP2013/071318, mail date is Nov. 5, 2013.
European Search Report issued with respect to application No. 13827611.8, mail date is Feb. 19, 2016.

* cited by examiner

Primary Examiner — Terressa Boykin
(74) Attorney, Agent, or Firm — Greenblum & Bernstein, P.L.C.

(57) ABSTRACT

The present invention provides a method for producing a branched aromatic polycarbonate resin that is molecular weight-increased, which comprises subjecting an aromatic polycarbonate prepolymer and a linking agent comprising a trifunctional or more of an aliphatic polyol compound to transesterification reaction in the presence of a transesterification catalyst under a reduced pressure condition.

14 Claims, No Drawings

METHOD FOR PRODUCING BRANCHED AROMATIC POLYCARBONATE RESIN

TECHNICAL FIELD

The present invention relates to a method for producing a branched aromatic polycarbonate resin. More specifically, the present invention relates to a method for producing a branched aromatic polycarbonate resin with a high polymerization degree, in which a trifunctional or more of an aliphatic polyol compound has been used as a linking agent.

BACKGROUND ART

A polycarbonate (PC) is excellent in heat resistance, impact resistance and transparency, so that it has widely been used in many fields in recent years. With regard to the producing method of the polycarbonate, a lot of investigation has conventionally been performed. Among these, the producing methods of a polycarbonate derived from an aromatic dihydroxy compound, for example, 2,2-bis(4-hydroxyphenyl)propane (hereinafter referred to as "bisphenol A"), has been industrialized by either the interfacial polymerization method or the melt polymerization method.

The polycarbonate produced by the interfacial polymerization method is manufactured from bisphenol A, an aromatic monohydroxy compound such as p-tert-butylphenol, etc., and phosgene, which can be produced under relatively low temperature conditions, so that the obtained polycarbonate is generally a linear polymer and shows Newtonian when it is melted. That is, with regard to shear fluidity, shear velocity dependency on the melt viscosity is small, and with regard to elongation fluidity, an extremely low viscosity is shown, so that when a large-sized extrusion molding or blow molding is carried out, dripping of the resin by self-weight is likely occurred, whereby molding of a large-sized product is difficult.

Melting characteristics of a polycarbonate resin can be shown by $Q=K \cdot P^N$ (wherein Q represents a flow amount (ml/sec) of a melt resin, K represents an intercept of a regression equation and is an independent variable (derived from a molecular weight or a structure of the polycarbonate resin), P represents a pressure (load: 10 to 160 kgf) (kg/cm$^2$) measured at 280° C. using a Koka-type flow tester, and N is a structural viscosity index). In the formula, when N=1, it shows Newtonian flow behavior, and as the N value becomes large, pressure dependency of the fluidity becomes large and non-Newtonian flow behavior is shown. A polycarbonate resin to be used for the uses such as a large capacity hollow molding article, a large-sized extrusion molding product, a blow molding product, etc., is evaluated its melt-flow characteristics by the N value, and that showing non-Newtonian flow behavior in which pressure dependency is large is generally preferred since dripping or draw down at the time of extrusion or molding can be prevented. Accordingly, it has been desired to optionally produce a polycarbonate resin having suitable melt-flow characteristics in which the N value is in the proper range.

Thus, in the interfacial polymerization method in general, non-Newtonian at the time of melting is controlled by adding a polycarbonate resin component having an extremely high molecular weight, or forming a branched structure by optionally incorporating the branching agent into the molecules. That is, improvement in blow moldability, drip-preventing performance and flame retardance, etc., has been carried out by optionally increasing a melt viscosity or an elongation viscosity at a low shear velocity region.

The reason why such a matter is possible is that, in the interfacial polymerization method, there is a correlation with a certain extent between an amount of the branching agent to be used and a branching degree, and the branching degree can be optionally controlled by the use of an optional amount of the branching agent. However, in the interfacial polymerization method, poisonous phosgene must be used in the producing method. In addition, there remains the problems that the apparatus is corroded by the by-producing hydrogen chloride or sodium chloride and a chlorine-containing compound such as methylene chloride, etc., used as a solvent with a large amount, and it is difficult to remove impurities such as sodium chloride, etc., or remaining methylene chloride, that may affect the physical properties of the polymer.

On the other hand, the melt polymerization method which has conventionally been known as another producing method of the polycarbonate resin is a method for producing a polycarbonate from an aromatic dihydroxy compound and a diarylcarbonate, and, for example, bisphenol A (BPA) and diphenylcarbonate (DPC) are subjected to transesterification reaction in a molten state, and polymerized while removing a by-produced aromatic monohydroxy compound.

The melt polymerization method has a merit that no solvent is used, etc., different from that of the interfacial polymerization method, but in the producing process, it is necessary to carry out the reaction at high temperature and under highly vacuum state for a long period of time to distill off the aromatic monohydroxy compound or the carbonic acid diester in the high viscosity polycarbonate molten material. Accordingly, as a producing apparatus, it is necessary to manufacture a specific apparatus which can endure the reaction under high temperature and highly vacuum state for a long period of time, and a strong stirring device since the product has high viscosity.

Also, an unspecified amount of the branched structure is generated in the high molecular weight polycarbonate produced by the conventional transesterification method at the time of production, so that the branching degree cannot be expected at the time of melting. In addition, it shows larger non-Newtonian as compared with the case produced by the interfacial polymerization method. This branched structure is based on a branched structure or on a crosslinked structure due to an ester bond formed by subjecting the polycarbonate to similar reaction to Kolbe-Schmitt reaction by an action of an alkali, and it has been known that it is difficult to control the amount of the branched structure. That is, there is a possibility that it increases or decreases depending on the apparatus and operating conditions, whereby it is extremely difficult to control the flow behavior at the time of melting depending on the various kinds of moldings.

Also, hue of the high molecular weight polycarbonate produced by the conventional transesterification tend to be lowered, and a product which becomes tinged with yellow can only be industrially obtained. It has further been known that it has a defect that strength is inferior (brittle fracture is remarkable).

As the conventionally known method to solve the problem of lowering in hue, there is an attempt to shorten the time required for the reaction by controlling a charging molar ratio of the polymerization starting materials and heightening the polymerization rate. More specifically, a molar ratio of DPCs/BPAs at the time of charging the materials for the polymerization reaction is adjusted to obtain the stoichiometrically maximum polymerization rate. While the charging ratio is also affected by the characteristics of the polymerization reaction apparatus, it is possible to obtain a relatively high speed polymerization rate by setting it between, for example, 1.03 to 1.10.

According to this method, however, whereas effectiveness in a low molecular weight region can be confirmed, in a high molecular weight region, a polymerization reaction product becomes an extremely high viscose fluid and the polymerization rate becomes markedly slow, so that resin deterioration such as crosslinking, branching or lowering in hue, can be markedly observed by heat retention, etc., for a long period of time during the polymerization. Therefore, it was substantially extremely difficult to obtain a high molecular weight polycarbonate in which a branched-structure amount has been controlled to an optional amount by controlling a molar ratio of the charged polymerization starting materials. That is, when a polycarbonate resin is produced by using the melt polymerization method, it was extremely difficult to control melt viscosity or elongation viscosity in a low shear velocity region similarly in the interfacial polymerization method and to quantitatively improve blow moldability, drip-preventing performance and flame retardance, etc., only by the addition amount of the branching agent.

As a means to structurally improve the polycarbonate, it has been made an attempt that a naturally generating branched structure is to be reduced in the transesterification method polycarbonate. For example, it has been proposed a transesterification method polycarbonate which has no branched structure or decreases as much as possible in Patent Documents 1 and 2. Also, in Patent Document 3, a method for producing a polycarbonate in which the above-mentioned Kolbe-Schmitt type branched structural material is 300 ppm or less has been proposed.

Further, in Patent Documents 4 and 5, it has been proposed that formation of a branched structure by the side reaction control of which is extremely difficult is eliminated by using a specific catalyst, whereby color tone is improved and a specific branched structure is positively introduced by using a polyfunctional compound, and a transesterification method polycarbonate in which hollow moldability has been improved by increasing non-Newtonian of flow behavior is disclosed.

However, these methods use a specific compound as a catalyst, or methods in which a specific catalyst(s) is selected or used in combination, which cannot be said to be general, and further, an influence of the catalyst on a human body or the environment is concerned at the time of using the obtained polycarbonate.

In Patent Document 6, an attempt has also been made to improve molding fluidity using 5-(dimethyl-p-hydroxybenzyl)salicylic acid as a branching agent. However, use of the polyfunctional compound involves the problem that gel is likely formed by crosslinking. In Patent Documents 7 and 8, it has been proposed to control the branched structure derived from the above-mentioned Kolbe-Schmitt type heat deterioration within a certain range by using a specific apparatus, temperature range, and retention conditions. According to this controlling method, however, it is difficult to fundamentally suppress the spontaneous generation of the branched structure, and yet, it is a heterogeneous structure by a spontaneously generated heat deterioration reaction, so that it is necessary to use specific operating conditions in the specific apparatus for optionally controlling the generating amount of the branched structure. In Patent Document 9, an acid anhydride has been used as a branching agent, but effects on the physical property or color tone due to occurrence of the acid at the time of production or introduction of the ester bond, etc., cannot be ignored.

Accordingly, it has been desired to develop a method for producing a polycarbonate which is excellent in color tone or mechanical property, and can control flow behavior, non-Newtonian and molding fluidity similarly to that of the polycarbonate by the interfacial polymerization method, by a general transesterification method simply and easily, or a producing method of a polycarbonate obtained by a transesterification method, which can optionally control the branching degree and can obtain a polycarbonate having a desired branching degree simply and easily.

Also, as an improving means in the aspect of the process, in Patent Document 10, it has been proposed, in a continuous producing method in which some polymerization vessels are connected, to use a specific horizontal stirring polymerization vessel as the final polymerization vessel. Further, in Patent Documents 11 and 12, it has been proposed a method using a twin-screw vent extruder. However, these are intended to promote elimination of the phenol, and whereas a high molecular weight polycarbonate can be obtained thereby, the physical property thereof could not be satisfied in both of the mechanical properties and molding fluidity.

The present inventors have previously found a novel method which is to chain-elongate the sealed terminal of the aromatic polycarbonate by linking with an aliphatic diol compound, as a method for accomplishing a high speed polymerization rate and obtaining an aromatic polycarbonate having good quality (Patent Document 13). According to this method, the sealed terminal of the aromatic polycarbonate is chain-elongated by linking with the aliphatic diol compound, whereby a high polymerization degree aromatic polycarbonate resin having an Mw of about 30,000 to 100,000 can be produced within a short period of time. This method can produce the polycarbonate by a high speed polymerization reaction, so that branching and crosslinking reaction generated by heat retention, etc., for a long period of time can be suppressed, and resin deterioration such as lowering in hue, etc., can be avoided.

The present inventors have also found that a correlation with a certain extent can be established between the amount of the branching agent to be used and the branching degree of the obtained high molecular weight branched aromatic polycarbonate, when an aromatic polycarbonate prepolymer into which a branched structure has been introduced using a predetermined amount of a branching agent is reacted with an aliphatic diol compound to link to each other in the presence of a transesterification catalyst (Patent Document 14).

Incidentally, with regard to the producing method of a branched polycarbonate resin using a trifunctional or more of the polyol compound, it has been proposed a continuous producing method of a branched polycarbonate including a process of, after producing a low molecular weight polycarbonate, adding thereto a polyfunctional compound and mixing (Patent Document 15).

Patent Document 1: JP Patent No. 3102927C
Patent Document 2: JP Hei. 5-202180A
Patent Document 3: JP Hei. 7-18069A
Patent Document 4: JP Hei. 5-271400A
Patent Document 5: JP Hei. 5-295101A
Patent Document 6: U.S. Pat. No. 4,562,242
Patent Document 7: JP Patent No. 324925C
Patent Document 8: JP Patent No. 3997424C
Patent Document 9: JP Patent No. 4598958C
Patent Document 10: JP Patent No. 2674813C
Patent Document 11: JP Sho. 52-36159B
Patent Document 12: JP Hei. 06-099552B
Patent Document 13: WO 2011/062220A Patent Document 14: WO 2012/108510A
Patent Document 15: WO 2012/005251A

DISCLOSURE OF THE INVENTION

Problems to be Solved by the Invention

Thus, according to the conventional preparation method of the high molecular weight aromatic polycarbonate, many problems are involved for controlling the branched structure optionally and stably. Also, an object of the invention disclosed in Patent Document 15 is not to develop a high molecular weight polycarbonate, and when an aromatic polyol disclosed therein as a polyfunctional compound is used, a sufficiently molecular weight-increased branched polycarbonate resin cannot be obtained.

Accordingly, it has been expected to develop a method for producing a polycarbonate applying the above-mentioned molecular weight-increasing technology which can accomplish sufficient molecular weight-increase while maintaining good quality inherently possessed by the polycarbonate, and further can accomplish a desired branching degree easily.

An object of the present invention is to provide a method for producing an aromatic polycarbonate resin having a sufficiently high molecular weight, and having a desired branching degree by the use of the general branching agent simply and easily.

Means to Solve the Problems

The present inventors have intensively studied to solve the above-mentioned problems, and as a result, they have found that by reacting an aromatic polycarbonate prepolymer with a trifunctional or more of an aliphatic polyol compound in the presence of a transesterification catalyst, an aromatic polycarbonate resin with high polymerization degree and good quality can be prepared simply and easily, whereby they have accomplished the present invention.

That is, the present invention relates to a method for producing a branched aromatic polycarbonate resin as mentioned below.

(1) A method for producing a branched aromatic polycarbonate resin comprises subjecting an aromatic polycarbonate prepolymer and a linking agent containing a trifunctional or more of an aliphatic polyol compound to transesterification reaction in the presence of a transesterification catalyst under a reduced pressure condition.

(2) The method for producing described in (1), wherein the branched aromatic polycarbonate resin has an N value (structural viscosity index) represented by the following numerical formula (I) of exceeding 1.25.

$$N \text{ value} = (\log(Q160 \text{ value}) - \log(Q10 \text{ value}))/(\log 160 - \log 10) \quad \text{(I)}$$

in the numerical formula (I), Q160 value represents a melt flow volume (ml/sec) per a unit time measured at 280° C. and a load of 160 kg, and Q10 value represents a melt flow volume (ml/sec) per a unit time measured at 280° C. and a load of 10 kg.

(3) The method for producing described in (1) or (2), wherein the aromatic polycarbonate prepolymer is a linear polycarbonate prepolymer having a weight average molecular weight (Mw) of 20,000 to 60,000, and an N value (structural viscosity index) of 1.25 or less.

(4) The method for producing described in (1) or (2), wherein the aromatic polycarbonate prepolymer is a branched chain polycarbonate prepolymer having a weight average molecular weight (Mw) of 20,000 to 60,000, and a branched structure has been introduced therein using a branching agent.

(5) The method for producing described in (4), wherein the N value is adjusted within the predetermined range based on a correlation between a total amount (A) to be used of an amount of the branching agent to be used and an amount of the trifunctional or more of the aliphatic polyol compound to be used, and a branching degree uses an N value (structural viscosity index) of the branched aromatic polycarbonate resin as an index, by adjusting the total amount (A) to be used.

(6) The method for producing described in (5), wherein the total amount (A) to be used and the N value (structural viscosity index) have a correlation satisfying the following numerical formula (II).

$$N \text{ value} = K_1 A + K_2 \quad \text{(II)}$$

in the numerical formula (II), $K_1$ is a constant of 0.1 to 2.0, and $K_2$ is a constant of 1.05 to 1.5.

(7) The method for producing described in any one of (1) to (6), wherein the trifunctional or more of the aliphatic polyol compound is trimethylolpropane.

(8) The method for producing described in any one of (1) to (7), wherein a ratio of the trifunctional or more of the aliphatic polyol compound in the linking agent is 5 mol % to 100 mol %.

(9) The method for producing described in any one of (1) to (8), wherein an amount of the linking agent to be added is 0.01 mol to 1.0 mol based on a total terminal amount of the aromatic polycarbonate prepolymer as 1 mol.

(10) The method for producing described in any one of (1) to (9), wherein a concentration of the terminal hydroxy group of the aromatic polycarbonate prepolymer is 1,500 ppm or less.

(11) The method for producing described in any one of (1) to (10), wherein a weight average molecular weight (Mw) of the branched aromatic polycarbonate is larger 5,000 or more than a weight average molecular weight (Mw) of the aromatic polycarbonate prepolymer.

(12) The method for producing described in any one of (1) to (11), wherein the transesterification is carried out at a temperature of 240° C. to 320° C.

(13) The producing method for producing described in any one of (1) to (12), wherein the transesterification reaction is carried out under a reduced pressure condition of 0.01 kPa (0.1 torr) to 13 kPa (100 torr).

(14) A branched aromatic polycarbonate resin having an N value (structural viscosity index) of exceeding 1.25 obtainable by the method for producing described in any one of (1) to (13).

(15) The branched aromatic polycarbonate resin described in (14), that has a weight average molecular weight (Mw) of 36,000 to 100,000.

(16) A branched aromatic polycarbonate resin comprises a group derived from an aromatic polycarbonate prepolymer and a group derived from a trifunctional or more of an aliphatic polyol compound which links the groups derived from the aromatic polycarbonate prepolymers, and has an N value (structural viscosity index) of exceeding 1.25.

Effects of the Invention

According to the present invention, due to a simple process that an aromatic polycarbonate prepolymer and a linking agent containing a trifunctional or more of an aliphatic polyol compound are subjected to transesterification reaction in the presence of a transesterification catalyst under a reduced pressure condition, a branched aromatic polycarbonate with a high molecular weight and high quality can be obtained under mild conditions within a short period of time.

BEST MODE TO CARRY OUT THE INVENTION

In the present specification, the term "process" as used herein includes not only a discrete process but a process that cannot be clearly distinguished from another processes as long as the expected purpose of the process of interest is achieved. In addition, the numerical range expressed herein using "to" refers to a range including the numerical values described before and after "to" as the minimum value and the maximum value, respectively. Moreover, with regard to the amount of each component in the composition, when there are plural substances corresponding to the component in the composition, the indicated amount means the total amount of the plural substances present in the composition, unless specifically stated otherwise.

The producing method of the present invention includes a process of subjecting an aromatic polycarbonate prepolymer and a linking agent containing a trifunctional or more of an aliphatic polyol compound (hereinafter, it may referred to simply "aliphatic polyol compound") to transesterification reaction in the presence of a transesterification catalyst under a reduced pressure condition. The producing method of the present invention can provide a method for producing an aromatic polycarbonate resin having a sufficiently high molecular weight, and having a desired branching degree by the use of a general branching agent simply and easily. This can be considered that a specific trifunctional or more of the aliphatic polyol type linking agent has a function of rapidly linking the aromatic polycarbonate prepolymers to each other and increasing the molecular weight.

According to the above, a time required for producing the aromatic polycarbonate resin can be shortened, and the reaction can be carried out under mild conditions (lowering the temperature and making faster rate of the reaction), so that it is possible to avoid high temperature and high shear conditions as compared with the conventional method, and coloring, crosslinking, gelation and the like are not generated in the resin, whereby a branched aromatic polycarbonate resin which is excellent in hue and quality containing no unexpected branched structure can be obtained.

Also, according to the producing method of the present invention, it has been found out that there is a correlation between the amount of the linking agent to be used and the molecular weight (reaching molecular weight) of the branched aromatic polycarbonate resin. According to this, it is possible to control the reaching molecular weight by changing the amount of the linking agent to be used.

Also, when an aromatic polycarbonate prepolymer into which the branched structure has been introduced by using a predetermined amount of the branching agent is used as the aromatic polycarbonate prepolymer, it is possible to obtain a branched aromatic polycarbonate having a high molecular weight and high quality as well as having a desired branching degree depending on the total amount of the branching agent and the trifunctional or more of the aliphatic polyol compound to be used. This is because the inventors have found that a correlation with a certain extent can be established between the total amount of the branching agent and the trifunctional or more of the aliphatic polyol compound to be used and the branching degree of the obtained high molecular weight branched aromatic polycarbonate, whereby the branched-structure amount of the aromatic polycarbonate can be optionally controlled in the melt polymerization method.

Moreover, according to the producing method of the present invention, a branching degree of the obtained branched aromatic polycarbonate resin can be controlled continuously and easily without changing the structure of the aromatic polycarbonate prepolymer. According to the above, it is possible to produce branched aromatic polycarbonate resins having various kinds of branching degrees continuously. In addition, the obtained branched aromatic polycarbonate resin is excellent in moldability and strength.

(1) Aromatic Polycarbonate Prepolymer

The aromatic polycarbonate prepolymer (hereinafter, it may simply refer to as "prepolymer") in the present invention is a polycondensation polymer including the structural unit (carbonate structural unit) represented by the following Formula (1) as a main repeating unit. The polycondensation polymer may be a linear polymer (hereinafter referred to as "linear polycarbonate prepolymer"), or a branched state polymer (hereinafter referred to as "branched polycarbonate prepolymer") into which a branched structure has been introduced by using a predetermined amount of a branching agent.

[Chemical Formula 1]

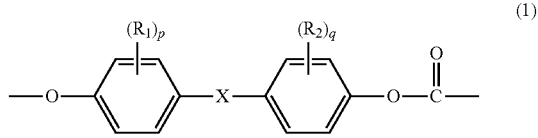

In the Formula (1), $R_1$ and $R_2$ each independently represent a hydrogen atom, a halogen atom, an alkyl group having 1 to 20 carbon atoms, an alkoxy group having 1 to 20 carbon atoms, a cycloalkyl group having 6 to 20 carbon atoms, an aryl group having 6 to 20 carbon atoms, a cycloalkoxy group having 6 to 20 carbon atoms, or an aryloxy group having 6 to 20 carbon atoms. p and q represent an integer of 0 to 4. X represents a group selected from the group of the divalent linking groups represented by the following Formula (1').

[Chemical Formula 2]

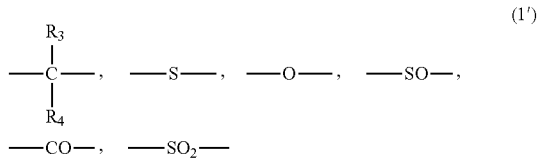

In the Formula (1'), $R_3$ and $R_4$ each independently represent a hydrogen atom, an alkyl group having 1 to 10 carbon atoms, or an aryl group having 6 to 10 carbon atoms, and $R_3$ and $R_4$ may be bonded to form an aliphatic ring.

Such an aromatic polycarbonate prepolymer may be said to be a polycondensation product including a reaction product of the aromatic dihydroxy compound and a carbonate bond-forming compound as a main repeating unit.

That is, the aromatic polycarbonate prepolymer may be used those produced by the conventionally known melt polymerization method in which an aromatic dihydroxy compound which induces the respective structures is subjected to transesterification reaction with a carbonic acid diester in the presence of a basic catalyst, or by the conventionally known interfacial polycondensation method in which an aromatic dihydroxy compound is reacted with phosgene or the like, in the presence of an acid bonding agent.

Further, the aromatic polycarbonate prepolymer may be a material synthesized by the method such as the solid phase polymerization method, the thin film polymerization method or the like. It is also possible to use a polycarbonate (recycled product of product PC) recovered from a used product such as a used disc molded product and the like.

Moreover, the polycarbonate to be used as the aromatic polycarbonate prepolymer in the present invention may be a plural kinds of a mixture. For example, it may be a mixed material of a polycarbonate polymerized by the interfacial polymerization method and a polycarbonate polymerized by the melt polymerization method, or else, it may be a mixed material of a polycarbonate polymerized by the melt polymerization method or the interfacial polymerization method and a polycarbonate of the recycled product.

The aromatic dihydroxy compound forming the main repeating unit of the aromatic polycarbonate prepolymer may be the compound represented by the following Formula.

[Chemical Formula 3]

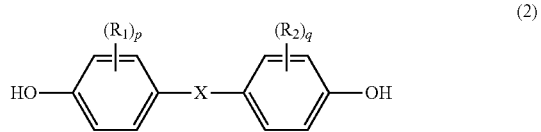

(2)

In the Formula (2), $R_1$ and $R_2$ each independently represent a hydrogen atom, a halogen atom, an alkyl group having 1 to 20 carbon atoms, an alkoxy group having 1 to 20 carbon atoms, a cycloalkyl group having 6 to 20 carbon atoms, an aryl group having 6 to 20 carbon atoms, a cycloalkoxy group having 6 to 20 carbon atoms, or an aryloxy group having 6 to 20 carbon atoms. p and q each represent an integer of 0 to 4. X represents a group selected from the group of divalent linking groups represented by the following Formula (2').

[Chemical Formula 4]

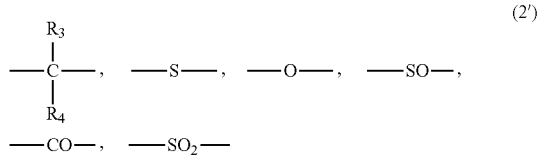

(2')

In the Formula (2'), $R_3$ and $R_4$ each independently represent a hydrogen atom, an alkyl group having 1 to 10 carbon atoms, or an aryl group having 6 to 10 carbon atoms, and $R_3$ and $R_4$ may be bonded to form an aliphatic ring.

Such an aromatic dihydroxy compound may specifically include bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)phenylmethane, 1,1-bis(4-hydroxyphenyl)-1-phenylethane, bis(4-hydroxyphenyl)diphenylmethane, 2,2-bis(4-hydroxy-3-methylphenyl)propane, 1,1-bis(4-hydroxy-3-tert-butylphenyl)propane, 2,2-bis(3,5-dimethyl-4-hydroxyphenyl)propane, 2,2-bis(4-hydroxy-3-phenylphenyl)propane, 2,2-bis(3-cyclohexyl-4-hydroxyphenyl)propane, 2,2-bis(4-hydroxy-3-bromophenyl)propane, 2,2-bis(3,5-dibromo-4-hydroxyphenyl)propane, 1,1-bis(4-hydroxyphenyl)cyclopentane, 1,1-bis(4-hydroxyphenyl)cyclohexane, 2,2-bis(4-hydroxy-3-methoxyphenyl)propane, 4,4'-dihydroxydiphenyl ether, 4,4'-dihydroxy-3,3'-dimethylphenyl ether, 4,4'-dihydroxydiphenyl sulfide, 4,4'-dihydroxy-3,3'-dimethyldiphenyl sulfide, 4,4'-dihydroxydiphenyl sulfoxide, 4,4'-dihydroxy-3,3'-dimethyldiphenyl sulfoxide, 4,4'-dihydroxydiphenyl sulfone, 4,4'-dihydroxydiphenyl sulfone, 4,4'-dihydroxy-3,3'-dimethyldiphenyl sulfone and the like.

Among these, 2,2-bis(4-hydroxyphenyl)propane is mentioned as a preferred material in the points of stability as a monomer, further a material containing less amount of impurities can be easily available and the like. It is also possible to use a plural kinds of the various aromatic dihydroxy compounds in combination for the purpose of control of the glass transition temperature, improvement in fluidity, control of optical properties such as improvement in the refractive index, lowering in double refraction and the like.

In the following, a method for producing the aromatic polycarbonate prepolymer according to the interfacial polymerization method or the melt polymerization method is explained more specifically.

As stated above, the aromatic polycarbonate prepolymer can be prepared by reacting an aromatic dihydroxy compound and a carbonate bond-forming compound.

In a case of the branched polycarbonate prepolymer, it can be prepared by reacting an aromatic dihydroxy compound and a carbonate bond-forming compound with a branching agent.

In the interfacial polymerization method, the carbonate bond-forming compound may include a halogenated carbonyl such as phosgene and the like, a haloformate compound and the like.

In the reaction of using, for example, phosgene as a carbonate bond-forming compound, the reaction is generally carried out in the presence of an acid binding agent and a solvent. As the acid binding agent, there may be used, for example, an alkali metal hydroxide such as sodium hydroxide, potassium hydroxide and the like, or an amine compound such as pyridine and the like. As the solvent, there may be used, for example, a halogenated hydrocarbon such as methylene chloride, chlorobenzene and the like. Also, for promoting the reaction, there may be used, for example, a catalyst such as a tertiary amine, a quaternary ammonium salt and the like. At this time, the reaction temperature is generally 0 to 40° C., and the reaction time is several minutes to 5 hours.

In the melt polymerization method, a carbonic acid diester is used as the carbonate bond-forming compound and specifically includes an aromatic carbonic acid diester such as diphenyl carbonate, ditolyl carbonate, bis(2-chlorophenyl) carbonate, m-cresyl carbonate, dinaphthyl carbonate and bis(4-phenylphenyl) carbonate. As others, an aliphatic carbonic acid diester such as dimethyl carbonate, diethyl carbonate, dibutyl carbonate and dicyclohexyl carbonate may be used, if desired. Among these, diphenylcarbonate is preferred in the points of reactivity, stability to coloring of the obtained resin, and further its cost. These carbonic acid diesters are preferably used with a ratio of 0.95 mol to 1.30 mol based on a total 1 mol of the aromatic dihydroxy compound(s), more preferably a ratio of 0.98 mol to 1.20 mol.

The melt polymerization method is carried out by the method in which a predetermined ratio of the aromatic dihydroxy component is stirred with the carbonic acid diester while heating under inert gas atmosphere, and the formed alcohol or phenols is/are distilled out. The reaction temperature may depend on the boiling point of the formed alcohol or phenols, and generally in the range of 120 to 350° C. The reaction is carried out by making the system reduced pressure from the initial stage and is completed while distilling out the formed alcohol or phenols. Also, a generally used basic compound or a transesterification catalyst may be used to promote the reaction.

When a branched polycarbonate prepolymer is used as the aromatic polycarbonate prepolymer, the branched structure is introduced by using a predetermined amount of a branching agent at the time of the reaction of the aromatic dihydroxy compound and the carbonate bond-forming compound.

The branched polycarbonate prepolymer in the present invention is a material into which the branched structure has been introduced into the molecular chain with an optional amount by using a branching agent at the time of the reaction of the aromatic dihydroxy compound and the carbonate bond-forming compound. As the branching agent, a polyfunctional compound having 3 or more, preferably 3 to 6 functional groups in one molecule may be used. Such the polyfunctional compound preferably used may be a compound having a phenolic hydroxy group and/or a carboxy group.

Specific examples of the trifunctional compound may include 1,1,1-tris(4-hydroxyphenyl)ethane, α,α,α'-tris(4-hydroxyphenyl)-1-ethyl-4-isopropylbenzene, 2,2',2"-tris(4-hydroxyphenyl)diisopropylbenzene, α-methyl-α,α',α"-tris(4-hydroxyphenyl)-1,4-diethylbenzene, α,α',α"-tris(4-hydroxyphenyl)-1,3,5-triisopropylbenzene, fluoroglycine, 4,6-dimethyl-2,4,6-tris(4-hydroxyphenyl)-heptane, 1,3,5-tris(4-hydroxyphenyl)benzene, 2,2-bis[4,4-(4,4'-dihydroxyphenyl)cyclohexylpropane, trimellitic acid, 1,3,5-benzenetricarboxylic acid, pyromellitic acid, trimethylolpropane, 1,2,5-pentatriol, 3,4-dihydroxybenzyl alcohol, 1,2,6-hexatriol, 1,3,5-adamantanetriol and the like.

Specific examples of the tetrafunctional or more of the compound may include purpurogallin, 2,3,4,4'-tetrahydroxybenzophenone, 2,3,4,4'-tetrahydroxy-diphenylmethane, gallein, 2,3,3',4,4',5'-hexahydroxybenzophenone and the like.

Above all, a more preferred material may include a polyol compound selected from the group consisting of 1,1,1-tris(4-hydroxyphenyl)ethane (the compound represented by the following structural Formula (a)), trimethylolpropane (the compound represented by the following structural Formula (b)), and α,α,α'-tris(4-hydroxyphenyl)-1-ethyl-4-isopropylbenzene (the compound represented by the following structural Formula (c)) by the reasons of the point that it is excellent in stability as a monomer, the point that a material containing less amount of impurities can be easily available and the like. Particularly preferred material is trimethylolpropane.

[Chemical Formula 5]

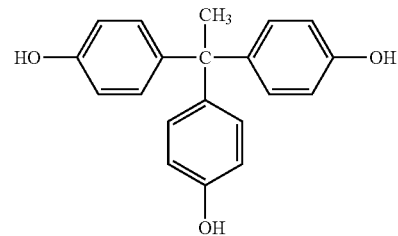
(a)

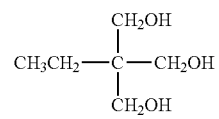
(b)

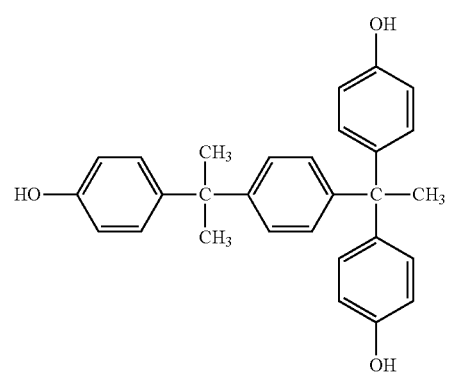
(c)

An amount of the branching agent (an introducing amount of the branched structure) to be used may vary depending on the purposes of improvement such as blow moldability, drip-preventing performance and flame retardance and the like, and it is desired to set the amount preferably 0.01 mol % to 1.0 mol %, more preferably 0.1 mol % to 0.9 mol %, particularly preferably 0.25 mol % to 0.8 mol % based on the whole amount (total molar number) of the carbonate structure unit(s) represented by the Formula (1) in the aromatic polycarbonate prepolymer. Or else, it is desired to set the amount preferably 0.01 mol % to 1.0 mol %, more preferably 0.1 mol % to 0.9 mol %, particularly preferably 0.25 mol % to 0.8 mol % based on the total molar number of the whole amount of the aromatic dihydroxy compound to be used and the branching agent.

When the aromatic polycarbonate prepolymer (linear polycarbonate prepolymer or branched polycarbonate prepolymer) is to be prepared, a dicarboxylic acid compound may be used with the aromatic dihydroxy compound in combination to prepare a polyester carbonate.

The dicarboxylic acid compound may be preferably terephthalic acid, isophthalic acid, naphthalenedicarboxylic acid, 1,4-cyclohexane dicarboxylic acid and the like, and these dicarboxylic acids are preferably employed to be reacted as an acid chloride or an ester compound. Also, when the polyester carbonate resin is produced, the dicarboxylic acid compound is preferably used in the range of 0.5 mol % to 45 mol % based on the total amount of the dihydroxy component and the dicarboxylic acid component as 100 mol %, more preferably in the range of 1 mol % to 40 mol %.

The aromatic polycarbonate prepolymer in the present invention is preferably a material at least a part of the terminal groups is end-capped by a terminal end-capped group(s). The compound constituting the terminal end-capped group is not particularly limited and may be preferably used, for example, an aromatic monohydroxy compound.

The terminal groups of the above-mentioned aromatic polycarbonate prepolymer preferably comprises a terminal end-capped group constituted by the aromatic monohydroxy compound in a ratio of 60 mol % or more based on the total terminal amount. The ratio of the sealing terminal group based on the total terminal amount of the prepolymer can be analyzed by $^1$H-NMR analysis of the prepolymer. Also, the ratio of the terminal end-capped group based on the total terminal amount of the prepolymer can be obtained by measuring the concentration of the terminal hydroxy group according to spectrometry of $^1$H-NMR analysis, or using a Ti complex. The concentration of the terminal hydroxy group by the $^1$H-NMR analysis is preferably 1,500 ppm or less, further preferably a material having 1,000 ppm or less is suitable. Incidentally, the concentration of the terminal hydroxy group can be measured by a molar basis.

The reaction of the aromatic polycarbonate prepolymer and the linking agent containing the trifunctional or more of the aliphatic polyol compound in the present invention is transesterification reaction of the terminal end-capped group of the prepolymer and the polyol compound, so that if the terminal hydroxy group amount of the range or less or the terminal end-capped group with the range or more is employed, a sufficient molecular weight-increasing effect by the linking reaction (molecular weight-increasing reaction) tends to be obtained. Also, a sufficient correlation tends to be established between an amount of the branching agent to be used and a branching degree of the obtained high molecular weight branched aromatic polycarbonate resin.

Specific examples of the terminal end-capped group may include a terminal group such as a phenyl terminal group, a cresyl terminal group, an o-tolyl terminal group, a p-tolyl terminal group, a p-t-butylphenyl terminal group, a biphenyl terminal group, an o-methoxycarbonylphenyl terminal group, a p-cumylphenyl terminal group and the like.

Among these, a terminal group constituted by an aromatic monohydroxy compound with a low boiling point which is easily removed from the reaction system of a linking reaction mentioned later is preferred, and a phenyl terminal group, a p-tert-butylphenyl terminal group and the like are preferred.

Such a terminal end-capped group can be introduced, in the interfacial method, by using a terminating agent at the time of producing the aromatic polycarbonate prepolymer. Specific example of the terminating agent may include p-tert-butylphenol. An amount of the terminating agent to be used may be optionally determined depending on the desired terminal amount (i.e., the desired molecular weight of the aromatic polycarbonate prepolymer) of the aromatic polycarbonate prepolymer, the reaction apparatus, the reaction conditions and the like.

In the melting method, the terminal end-capped group can be introduced by using the aromatic carbonic acid diester such as diphenylcarbonate, in an excess amount to that of the aromatic dihydroxy compound at the time of producing the aromatic polycarbonate prepolymer.

Among the aromatic polycarbonate prepolymer to be used in the present invention, the linear polycarbonate prepolymer is a prepolymer produced by the method not containing the process in which the branched structure is introduced particularly by using the branching agent, but it may have a branched structure naturally occurred at the time of production. The N value (structural viscosity index) of such the linear polycarbonate prepolymer is not particularly limited, and an upper limit of the N value is 1.25 or less, preferably 1.23 or less. Also, the lower limit thereof is 1.15 or more, preferably 1.19 or more.

On the other hand, among the aromatic polycarbonate prepolymer to be used in the present invention, the branched polycarbonate prepolymer is a prepolymer produced by the method containing a process in which the branched structure is introduced by using the branching agent, and the N value thereof is not particularly limited, but the lower limit of the N value preferably exceeds 1.25. Also, the upper limit thereof is 1.50 or less, preferably 1.40 or less, more preferably 1.30 or less.

Incidentally, the N value of the prepolymer cannot be measured in some cases when the molecular weight of the prepolymer is low.

Here, the N value means the structural viscosity index represented by the following numerical formula (I). The structural viscosity index, N value, is an index of a branching degree of the branched aromatic polycarbonate resin in the present invention.

$$N \text{ value} = (\log(Q160 \text{ value}) - \log(Q10 \text{ value}))/(\log 160 - \log 10) \quad \text{(I)}$$

In the numerical formula (I), Q160 value represents a melt flow volume (ml/sec) per a unit time measured at 280° C. and a load of 160 kg, and Q10 value represents a melt flow volume (ml/sec) (calculated from stroke=7.0 mm to 10.0 mm) per a unit time measured at 280° C. and a load of 10 kg. Incidentally, the Q value is measured by using a device, trade name of "type CFT-500D" (nozzle diameter 1 mm×nozzle length 10 mm) manufactured by Shimadzu Corporation, and is a flow amount (ml/sec) of a melt resin calculated from the stroke=7.0 mm to 10.0 mm. Incidentally, the logarithm is a common logarithm that makes 10 a base.

The aromatic polycarbonate prepolymer (linear polycarbonate prepolymer or branched polycarbonate prepolymer) to be used in the present invention preferably has a weight average molecular weight (Mw) of 5,000 or more, more preferably 10,000 or more, further preferably 20,000 or more, and particularly preferably 22,000 or more. Also, the weight average molecular weight (Mw) is preferably 60,000 or less, more preferably 50,000 or less, further preferably 40,000 or less, and particularly preferably 35,000 or less. Further, the weight average molecular weight (Mw) is preferably 20,000 to 60,000, more preferably 20,000 to 40,000, further preferably 20,000 to 35,000, and particularly preferably 22,000 to 35,000.

If the molecular weight of the aromatic polycarbonate prepolymer is the lower limit value or more, an effect of the linking agent containing the aliphatic polyol compound described later providing on the physical property as the copolymer component tends to be suppressed. According to this, it is easy to improve physical property, and an effect of increasing the molecular weight of the branched aromatic polycarbonate resin tends to be sufficiently obtained. Also, if the molecular weight of the aromatic polycarbonate prepolymer is the lower limit value or more, a long period of time is not required for increasing the molecular weight, hue becomes better, and formation of a heterogeneous structure tends to be suppressed. Also, when the branched polycarbonate prepolymer is used as the aromatic polycarbonate prepolymer, a sufficient correlation tends to be established between a total amount of the branching agent and the aliphatic polyol compound to be used and a branching degree of the obtained high molecular weight branched aromatic polycarbonate resin.

If the molecular weight of the aromatic polycarbonate prepolymer is the upper limit or lower, the concentration of the terminal end-capped group is increased and an effect of increasing the molecular weight tends to be sufficiently obtained. In addition, it can be suppressed that the prepolymer itself become high viscose, as the reaction conditions, it is not necessary to carry out the reaction at high temperature, and high shear for a long period of time, spontaneous generation of an unexpected branched crosslinking structure at the prepolymer itself can be suppressed, whereby an objective high quality branched aromatic polycarbonate can be easily obtained. Also, a sufficient correlation tends to be established between a total amount of the branching agent and the aliphatic polyol compound to be used and a branching degree of the obtainable high molecular weight branched aromatic polycarbonate resin.

(2) Linking Agent Containing Trifunctional or More of Aliphatic Polyol Compound

<1> Trifunctional or More of Aliphatic Polyol Compound

The present method for producing includes a process of transesterification of the aromatic polycarbonate prepolymer with the linking agent containing a trifunctional or more of the aliphatic polyol compound in the presence of a transesterification catalyst under a reduced pressure condition. That is, the polyol compound is reacted with the aromatic polycarbonate prepolymer to replace the terminal end-capped group constituted by the aromatic hydroxy compound which is existing in the aromatic polycarbonate prepolymer with an alcoholic hydroxy group of the aliphatic polyol compound, whereby the aromatic polycarbonate prepolymers are linked through the aliphatic polyol compound with each other to increase the molecular weight. By such the method, a high molecular weight aromatic polycarbonate resin can be obtained easily and rapidly by the melt polymerization method with the conditions of the general transesterification method without searching a specific device or operation conditions. In the present invention, it is essential to use the aliphatic polyol compound, and there is a tendency that the effects of the present invention cannot sufficiently be achieved by the aromatic polyphenol compound.

Also, in a case that a branched polycarbonate prepolymer into which a predetermined amount of the branched structure has been introduced is used as the aromatic polycarbonate prepolymer, the branching degree of the obtainable branched aromatic polycarbonate resin shows a certain correlation with the total amount to be used of the amount of the branching agent to be used at the time of introducing the branched structure into the aromatic polycarbonate prepolymer and the amount of the aliphatic polyol compound to be used in the linking agent. Accordingly, it is possible to control the branching degree in the melting method depending on the total amount to be used of the branching agent and the aliphatic polyol compound, so that a branched aromatic polycarbonate resin having an optional branching degree can be obtained.

The trifunctional or more of the aliphatic polyol compound to be used in the present invention means a polyfunctional aliphatic type compound having three or more alcoholic hydroxy groups (a hydroxy hydrocarbon group; preferably —$(CH_2)_n$—OH; n is an integer of 1 to 10) in one molecule as functional groups. The alcoholic hydroxy group is preferably a primary alcoholic hydroxy group in the viewpoint of a reaction rate.

Such the aliphatic polyol compound may preferably include a polyfunctional aliphatic type compound having 3 to 6 alcoholic hydroxy groups in one molecule. It may particularly preferably include a polyfunctional aliphatic type compound having three alcoholic hydroxy groups in one molecule.

Such a polyfunctional aliphatic type compound may be preferably exemplified by a compound having 4 to 12 carbon atoms, more preferably 5 to 10 carbon atoms, particularly preferably 5 to 6 carbon atoms.

Specific examples of the trifunctional polyfunctional aliphatic type compound may include trimethylolpropane, trimethylolethane, 1,2,3-butanetriol, 1,2,4-butanetriol, 1,2,5-pentanetriol, 1,2,6-hexanetriol, 1,2,7-heptanetriol, 1,2,8-octanetriol, 1,2,9-nonanetriol, 1,2,10-decanetriol, 1,3,5-adamantanetriol, 1,2,3-cyclohexanetriol, 1,3,5-cyclohexanetriol, glycerol, 1,3,5-benzenetrimethanol and the like.

The tetrafunctional polyfunctional aliphatic type compound may include 1,2,3,4-butanetetraol.

Among these, a material in which all the alcoholic hydroxy groups are the primary alcoholic hydroxy groups such as trimethylolpropane (the compound represented by the following structural Formula (3a)), trimethylolethane (the compound represented by the following structural Formula (3b)), etc., is preferred in the point that these are excellent in reactivity that the reaction can proceed more rapidly.

Moreover, among these, trimethylolpropane is a particularly preferred material according to the reasons in the points of stability as a monomer, and further a material containing less amount of impurities can be easily available and the like.

[Chemical Formula 6]

(3a)

(3b)

Also, in consideration of distilling off the aromatic monohydroxy compound derived from the terminal end-capped group which is by-produced in the reaction of the aromatic polycarbonate prepolymer with the trifunctional or more of the aliphatic polyol compound, the trifunctional or more of the aliphatic polyol compound to be used preferably has a higher boiling point than that of the aromatic monohydroxy compound. In addition, it is necessary to fix (to promote the reaction certainly) the reaction under a constant temperature and pressure, so that the trifunctional or more of the aliphatic polyol compound having a higher boiling point is preferably used. Thus, the trifunctional or more of the aliphatic polyol compound to be used in the present invention may specifically include those having a boiling point of 240° C. or higher, preferably 250° C. or higher.

<2> Other Linking Agents

As the linking agent to be used in the producing method of the present invention, in addition to the trifunctional or more of the aliphatic polyol compound, other polyol compounds may be used in combination. Such the polyol compound may include an aliphatic diol compound having an aliphatic hydrocarbon group bonding to a terminal hydroxy group (OH group). Here, the terminal hydroxy group means a hydroxy group which contributes to form a carbonate bonding between the aromatic polycarbonate prepolymers by transesterification reaction.

The aliphatic hydrocarbon group may include an alkylene group and a cycloalkylene group and a part of these may be substituted by an aromatic group, a heterocyclic ring-containing group and the like. More specifically, a compound having a divalent alcoholic hydroxy group represented by the following Formula (A) may be included.

[Chemical Formula 7]

$$HO-(CR_1R_2)_n-Q-(CR_3R_4)_n-OH \quad (A)$$

In the Formula (A), Q represents a hydrocarbon group having 3 or more carbon atoms which may contain a hetero atom. The lower limit of the carbon atoms of the hydrocarbon group is 3, preferably 6, more preferably 10, and the upper limit is preferably 40, more preferably 30, further preferably 25.

The hetero atom may include an oxygen atom (O), a sulfur atom (S), a nitrogen atom (N), a fluorine atom (F) and a silicon atom (Si). Among these, particularly preferred are an oxygen atom (O) and a sulfur atom (S).

The hydrocarbon group may be a linear structure, a branched structure or a cyclic structure. Also, Q may include a cyclic structure such as an aromatic ring, a heterocyclic ring and the like.

In the Formula (A), $R_1$, $R_2$, $R_3$ and $R_4$ each independently represent a group selected from the group consisting of a hydrogen atom, an aliphatic hydrocarbon group having 1 to 30 carbon atoms, preferably 1 to 10 carbon atoms, and an aromatic hydrocarbon group having 6 to 20 carbon atoms, preferably 6 to 10 carbon atoms.

The aliphatic hydrocarbon group may specifically include a linear or branched alkyl group and a cyclohexyl group. The alkyl group may include a methyl group, an ethyl group, a propyl group, an isopropyl group, an n-butyl group, an isobutyl group, a t-butyl group, an n-amyl group, an isoamyl group, an n-hexyl group, an isohexyl group and the like.

The aromatic hydrocarbon group may include an aryl group, a naphthyl group and the like. The aryl group may include a phenyl group, a phenethyl group, a benzyl group, a tolyl group, o-xylyl group and the like, preferably a phenyl group.

However, at least one of $R_1$ and $R_2$, and at least one of $R_3$ and $R_4$ are each selected from the group consisting of a hydrogen atom and an aliphatic hydrocarbon group.

$R_1$ to $R_4$ each independently represent particularly preferably a group selected from the group consisting of a hydrogen atom and an aliphatic hydrocarbon group having 1 to 30 carbon atoms, preferably 1 to 10 carbon atoms.

Particularly preferred aliphatic hydrocarbon group may include a linear or branched alkyl group. The alkyl group may include a methyl group, an ethyl group, a propyl group, an isopropyl group, an n-butyl group, an isobutyl group, a t-butyl group and an isoamyl group.

n and m each independently represent an integer of 0 to 10, preferably 0 to 4. Provided that Q does not contain an aliphatic hydrocarbon group bonding to the terminal hydroxy group, n and m each independently represent an integer of 1 to 10, preferably 1 to 4.

Such the aliphatic diol compound is preferably those in which $R_1$ to $R_4$ are each a hydrogen atom. That is, the aliphatic diol compound which can be used with the polyol compound in the present invention is preferably a primary diol compound, further preferably a primary diol compound excluding the linear aliphatic diol.

On the other hand, in the present invention, a secondary diol compound in which at least one of $R_1$ to $R_4$ is an aliphatic hydrocarbon group, or a secondary diol compound in which n and m are both 0 and Q is a branched aliphatic hydrocarbon group or a cyclic hydrocarbon group may be used.

The aliphatic diol compound may more preferably include the compound having a divalent alcoholic hydroxy group represented by any of the following Formulae (i) to (iii).

[Chemical Formula 8]

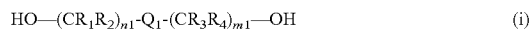

$$HO-(CR_1R_2)_{n1}-Q_1-(CR_3R_4)_{m1}-OH \quad (i)$$

$$HO-(CR_1R_2)_{n2}-Q_2-(CR_3R_4)_{m2}-OH \quad (ii)$$

$$HO-(CR_1R_2)_{n3}-Q_3-(CR_3R_4)_{m3}-OH \quad (iii)$$

In the Formulae (i) to (iii), $R_1$ to $R_4$ each independently represent a group selected from the group consisting of a hydrogen atom, an aliphatic hydrocarbon group having 1 to 30 carbon atoms, preferably 1 to 10 carbon atoms, and an aromatic hydrocarbon group having 6 to 20 carbon atoms, preferably 6 to 10 carbon atoms. Specific examples thereof are the same as those in the Formula (A).

In the Formula (i), $Q_1$ represents a hydrocarbon group having 6 to 40 carbon atoms, which contains an aromatic ring, preferably a hydrocarbon group having 6 to 30 carbon atoms, which contains aromatic ring. Also, $Q_1$ may contain at least one hetero atom selected from the group consisting of an oxygen atom (O), a sulfur atom (S), a nitrogen atom (N), a fluorine atom (F) and a silicon atom (Si).

n1 and m1 each independently represent an integer of 1 to 10, preferably an integer of 1 to 4. The aromatic ring may include a phenylene group, a biphenylene group, a fluorenylene group, a naphthylene group and the like.

In the Formula (ii), Q2 represents a linear or branched hydrocarbon group having 3 to 40 carbon atoms which may contain a heterocyclic ring, preferably a linear or branched hydrocarbon group having 3 to 30 carbon atoms which may contain a heterocyclic ring. $Q_2$ is particularly preferably a branched chain hydrocarbon group having 3 to 40 carbon atoms, more preferably having 3 to 30 carbon atoms and containing no heterocyclic ring.

Q2 may be also contain at least one hetero atom selected from the group consisting of an oxygen atom (O), a sulfur atom (S), a nitrogen atom (N), a fluorine atom (F) and a silicon atom (Si). n2 and m2 each independently represent an integer of 0 to 10, preferably an integer of 0 to 4.

In the Formula (iii), $Q_3$ represents a group containing a cyclic hydrocarbon group (preferably a cycloalkylene group) having 6 to 40 carbon atoms, preferably a group containing a cyclic hydrocarbon group having 6 to 30 carbon atoms. n3 and m3 each independently represent an integer of 0 to 10, preferably an integer of 1 to 4. The cycloalkylene group may include a cyclohexylene group, a bicyclodecanylene group, a tricyclodecanylene group and the like.

Among the aliphatic diol compounds represented by either of the Formulae (i) to (iii), more preferred compound is a compound represented by either of the Formula (i) or (ii), and particularly preferred compound is a compound represented by the Formula (ii). In addition, as the aliphatic diol compounds represented by either of the Formulae (i) to (iii), particularly preferred is a primary diol compound, further preferred is a primary diol compound excluding the linear aliphatic diol.

When the specific examples which can be used as the aliphatic diol compounds represented by either of the Formulae (i) to (iii) in the present invention is shown by classifying the primary diol compound and the secondary diol compound, it is as follows.

(i) Primary Diol Compound: 2-Hydroxyethoxy Group-Containing Compound

The aliphatic diol compound may include a 2-hydroxyethoxy group-containing compound represented by the following formula.

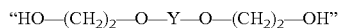

"HO—(CH$_2$)$_2$—O—Y—O—(CH$_2$)$_2$—OH"

Here, Y may include an organic group (A) having the structure shown below, an organic group (B), an organic group (C) selected from a divalent phenylene group and naphthylene group, and a cycloalkylene group (D) selected from the following structural formulae.

[Chemical Formula 9]

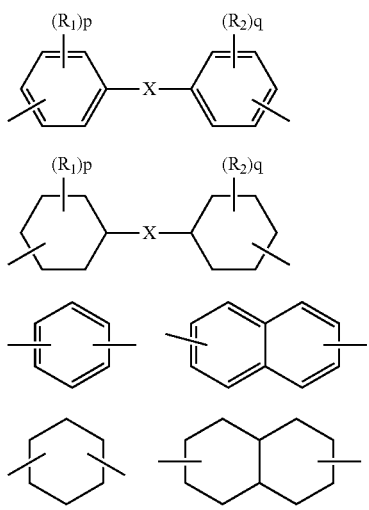

Here, X represents a single bond or a group having the following structure. R$_1$ and R$_2$ each independently represent a hydrogen atom, an alkyl group having 1 to 4 carbon atoms, a phenyl group or a cycloalkyl group, each of which may contain a fluorine atom. R$_1$ and R$_2$ preferably represent a hydrogen atom or a methyl group. p and q each independently represent an integer of 0 to 4 (preferably 0 to 3).

[Chemical Formula 10]

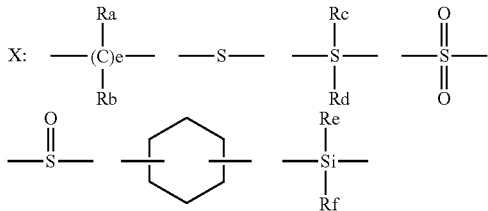

In the structures, Ra and Rb each independently represent a hydrogen atom, a linear or branched alkyl group having 1 to 30 carbon atoms, preferably 1 to 12, further preferably 1 to 6, particularly preferably 1 to 4, an aryl group having 6 to 12 carbon atoms, or a cycloalkyl group having 6 to 12 carbon atoms, or may be connected to each other to form a ring.

The ring formed by connecting Ra and Rb to each other may be mentioned an aromatic ring, an alicyclic ring, a heterocyclic ring (containing O and/or S) or an optional combination thereof. When Ra and Rb are alkyl groups or form a ring to each other, these may contain a fluorine atom(s).

Rc and Rd each independently represent an alkyl group (particularly preferably a methyl group or an ethyl group) having 1 to 10 carbon atoms, preferably 1 to 6, more preferably 1 to 4, and these may contain a fluorine atom(s). e represents an integer of 1 to 20, preferably 1 to 12.

Re and Rf each independently represent a hydrogen atom, a halogen atom, a linear or branched alkyl group having 1 to 10 carbon atoms, an aryl group having 6 to 12 carbon atoms, a cycloalkyl group having 6 to 12 carbon atoms or an alkoxy group having 1 to 20 carbon atoms, and these may contain a fluorine atom(s). Re and Rf may be also connected to each other to form a ring.

The linear or branched alkyl group may preferably be those having 1 to 6 carbon atoms, more preferably having 1 to 4 carbon atoms, particularly preferably a methyl group or an ethyl group. The alkoxy group having 1 to 20 carbon atoms may preferably be a methoxy group or an ethoxy group.

Examples of the more specific aliphatic diol compounds are shown below. In the following Formulae, n and m each independently represent an integer of 0 to 4. R$_1$ and R$_2$ each independently represent a hydrogen atom, a methyl group, an ethyl group, an n-propyl group, an isopropyl group, a butyl group, an isobutyl group, a phenyl group or a cyclohexyl group.

<When Y is Organic Group (A)>

Preferred compounds when Y is the organic group (A) are shown below.

[Chemical Formula 11]

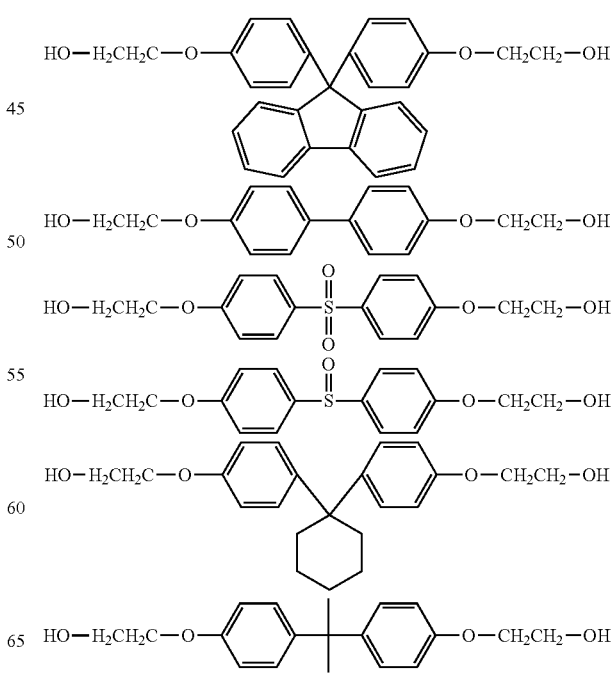

-continued

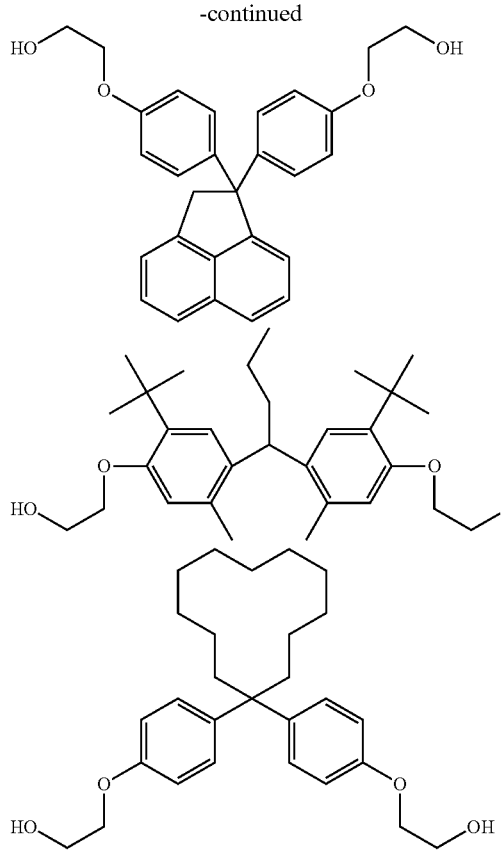

-continued

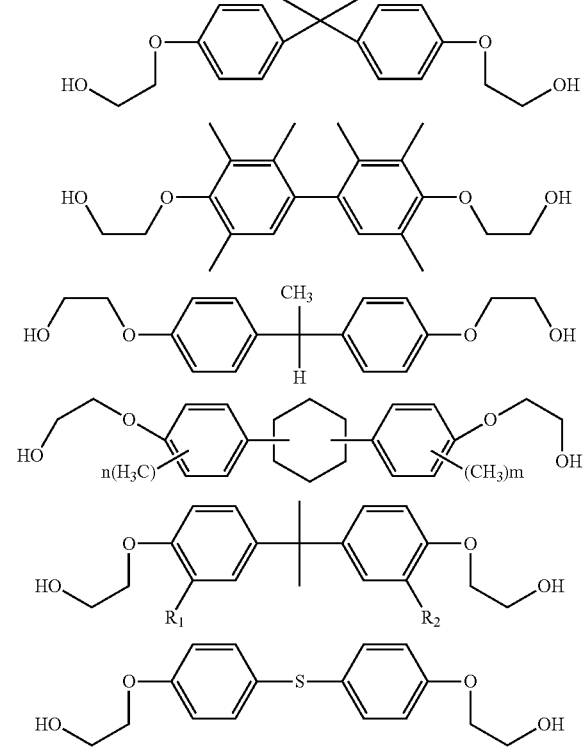

<When Y is Organic Group (B)>

When Y is the organic group (B), X preferably represents —CRaRb— (Ra and Rb each independently represent a hydrogen atom or an alkyl group having 1 to 6 carbon atoms, preferably a methyl group). More specifically, the compounds shown below may be included.

[Chemical Formula 12]

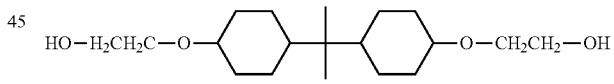

<When Y is Organic Group (C)>

Preferred compounds when Y is the organic group (C) are shown below.

[Chemical Formula 13]

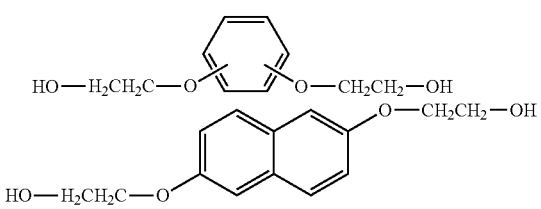

Among the 2-hydroxyethoxy group-containing compounds, particularly preferred compounds are shown below.

[Chemical Formula 14]

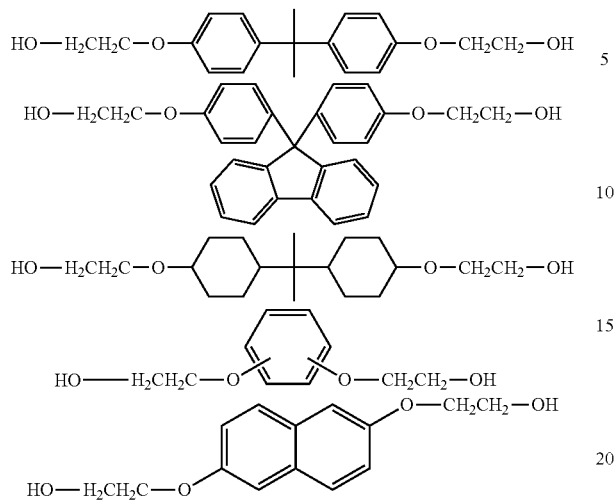

(ii) Primary Diol Compound: Hydroxyalkyl Group-Containing Compound

The aliphatic diol compound of the present invention may preferably include a hydroxyalkyl group-containing compound represented by the following Formula:

"HO—$(CH_2)_r$—Z—$(CH_2)_r$—OH".

Here, r is 1 or 2. That is, the hydroxyalkyl group may be mentioned a hydroxymethyl group and a hydroxyethyl group.

Z may include an organic group as shown below.

[Chemical Formula 15]

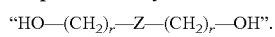

Preferred hydroxyalkyl group-containing compounds are shown below. In the following formulae, n and m each independently represent an integer of 0 to 4.

[Chemical Formula 16]

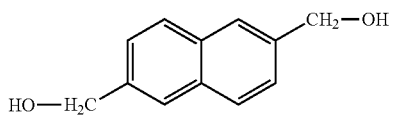

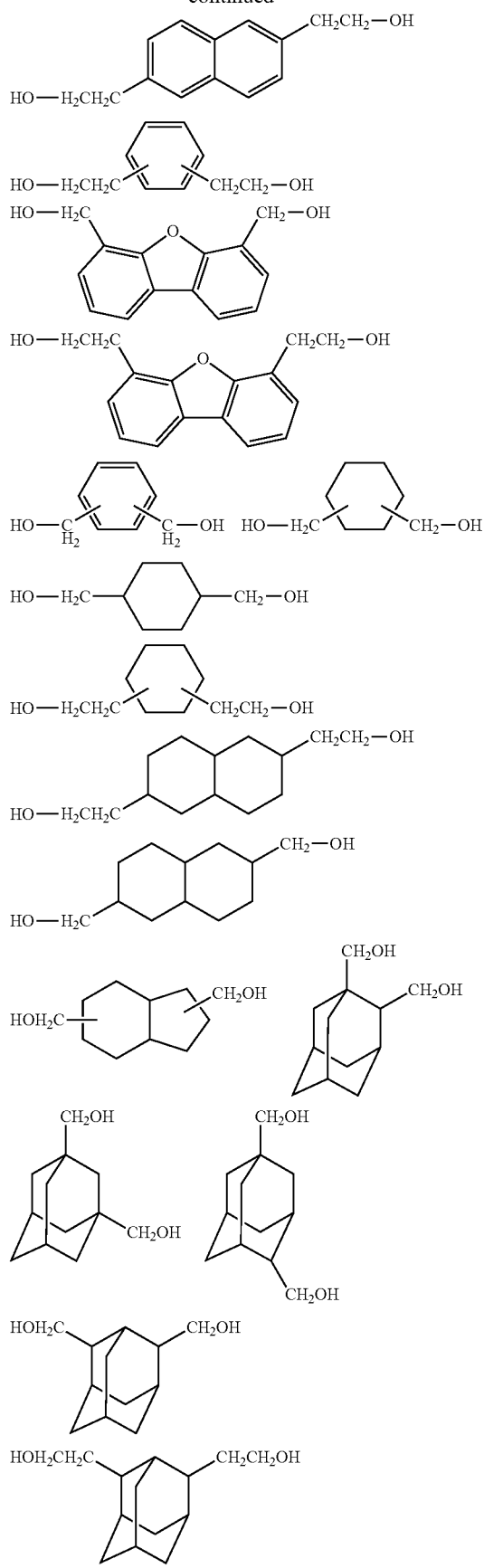

-continued

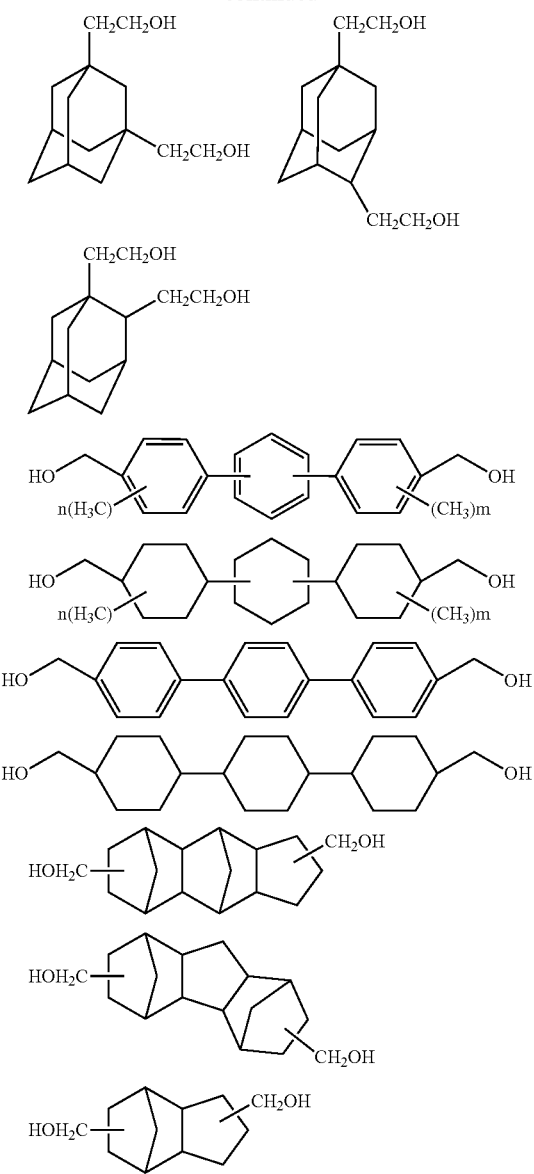

(iii) Primary Diol Compound: Carbonate Diol Type Compound

As the preferred aliphatic diol compound in the present invention, a carbonate diol type compound represented by the following Formula may be included. Here, R may include an organic group having the structure shown below. In the following Formulae, n is an integer of 1 to 20, preferably 1 to 2. m is an integer of 3 to 20, preferably 3 to 10.

[Chemical Formula 17]

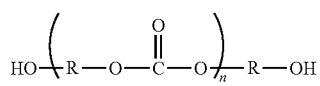

n = 1 to 20 (preferably 1 to 2)

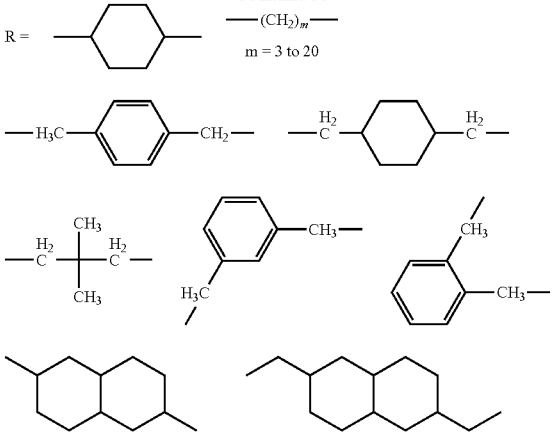

As the polycarbonate diol type compound, there may preferably include the polycarbonate diol type compound constituted by a diol (cyclohexanedimethanol, neopentyl glycol, decahydronaphthalenedimethanol or benzenedimethanol) shown below or a diol including the above as a main component.

[Chemical Formula 18]

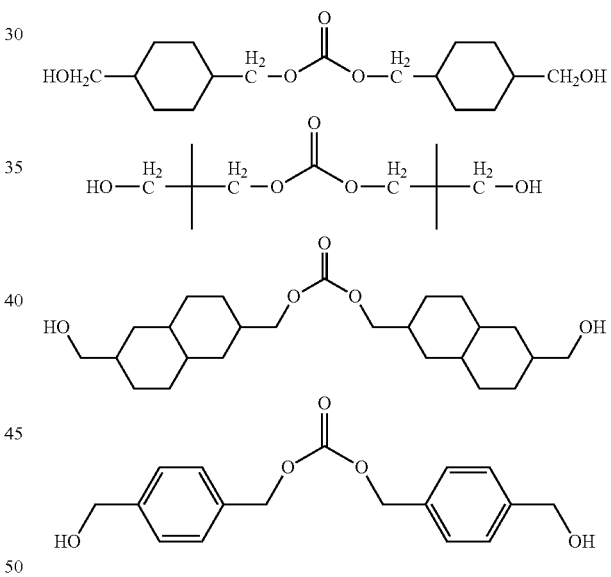

As the aliphatic diol compound, the primary diol compound selected from the (i) 2-hydroxyethoxy group-containing compound, (ii) hydroxyalkyl group-containing compound and (iii) carbonate diol type compound is preferably used.

The aliphatic diol compound is not particularly limited to the specific primary diol compound, and a primary diol compound other than the primary diol compound or a secondary diol compound may be used. Examples of the other primary diol compounds or secondary diol compounds that can be used are shown below.

In the following Formulae, $R_1$ and $R_2$ each independently represent a hydrogen atom, a halogen atom, an amino group, a nitro group, an alkyl group having 1 to 20 carbon atoms, an alkoxy group having 1 to 20 carbon atoms, a cycloalkyl group having 6 to 20 carbon atoms, an aryl group having 6 to 20 carbon atoms, a cycloalkoxy group having 6 to 20 carbon atoms or an aryloxy group having 6 to 20 carbon atoms, preferably a hydrogen atom, a fluorine atom, a methyl group, an ethyl group, a propyl group, an isopropyl group, an n-butyl group, an isobutyl group, a sec-butyl group, a tert-butyl group, a pentyl group, an isoamyl group, a cyclohexyl group, a phenyl group, a benzyl group, a methoxy group or an ethoxy group.

$R_5$, $R_6$, $R_7$ and $R_8$ are each a hydrogen atom, or a monovalent alkyl group having 1 to 10 carbon atoms. $R_9$ and $R_{10}$ each independently represent a linear or branched alkyl group having 1 to 8 carbon atoms, preferably 1 to 4 carbon atoms.

Ra and Rb each independently represent a hydrogen atom, a linear or branched alkyl group having 1 to 30 carbon atoms, preferably 1 to 12, further preferably 1 to 6, particularly preferably 1 to 4, an aryl group having 6 to 12 carbon atoms, or a cycloalkyl group having 6 to 12 carbon atoms, or may be bonded to each other to form a ring. The ring may include an aromatic ring, an alicyclic ring, a heterocyclic ring (containing O and/or S) and an optional combination thereof. When Ra and Rb are alkyl groups or form a ring to each other, these may contain a fluorine atom(s).

R' is an alkylene group having 1 to 10 carbon atoms, preferably 1 to 8. Re and Rf each independently represent a hydrogen atom, a halogen atom, a methyl group, an ethyl group, an n-propyl group, an isopropyl group, a butyl group, an isobutyl group, a phenyl group, a methoxy group or an ethoxy group. m' is an integer of 4 to 20, preferably 4 to 12. m" is an integer of 1 to 10, preferably 1 to 5. e is an integer of 1 to 10.

<Other Primary Diol Compound>

[Chemical Formula 19]

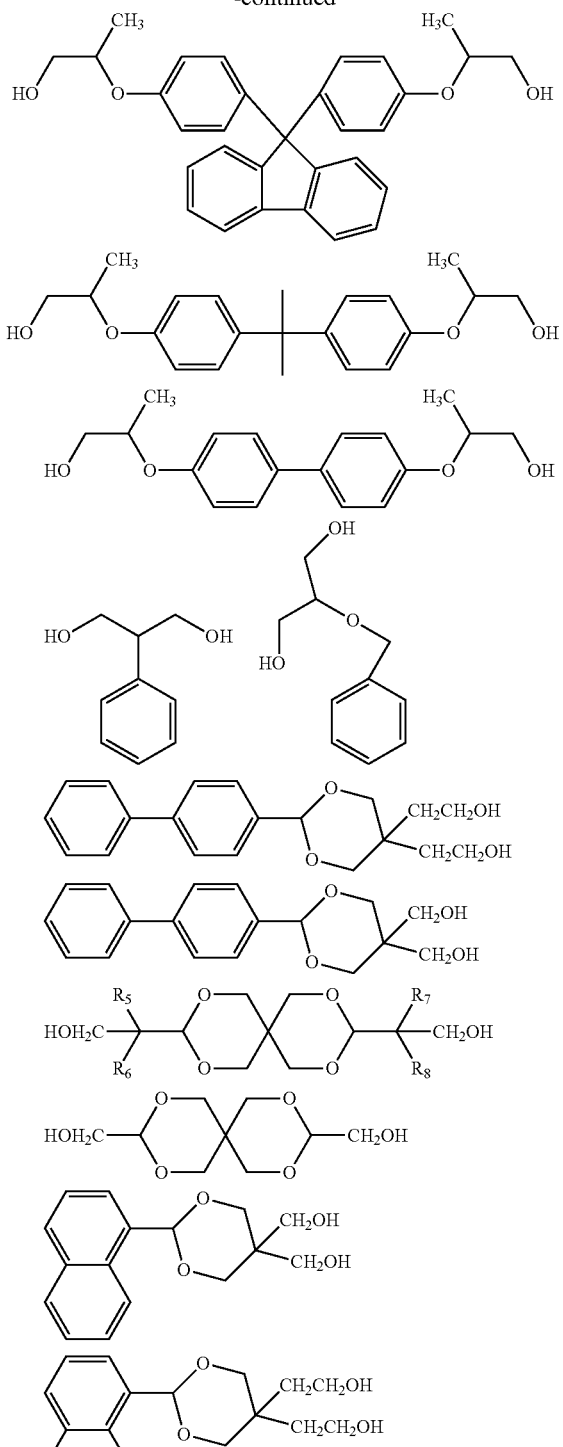

[Chemical Formula 20]

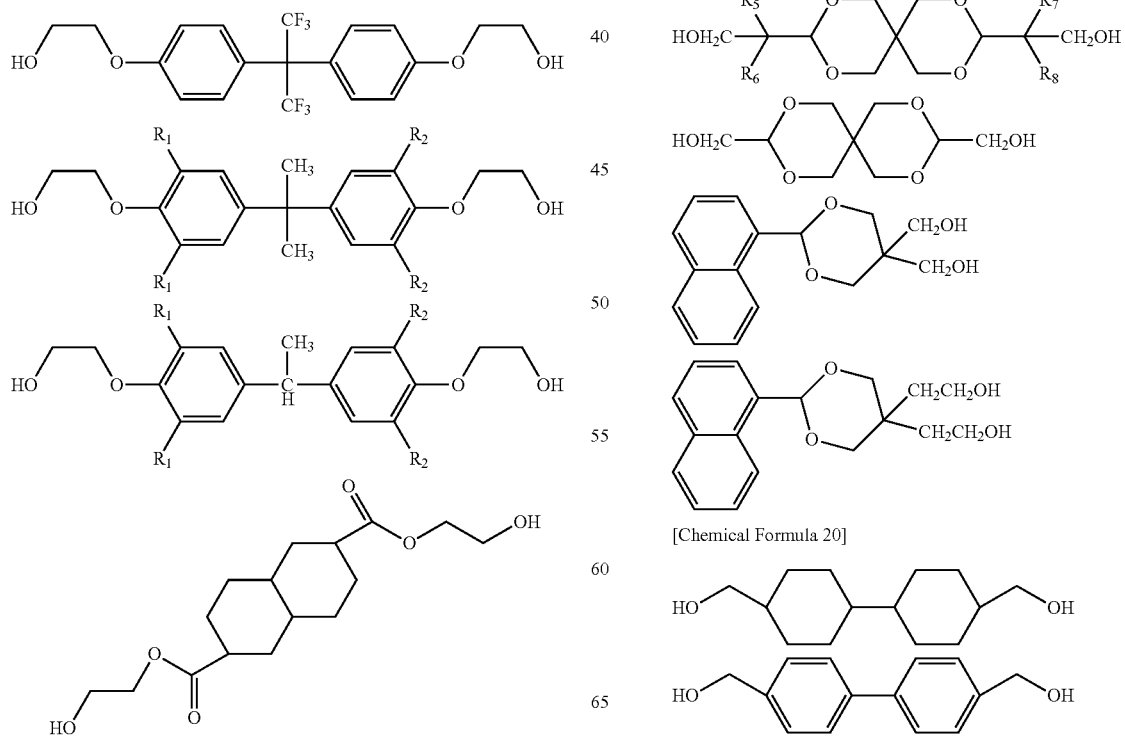

-continued

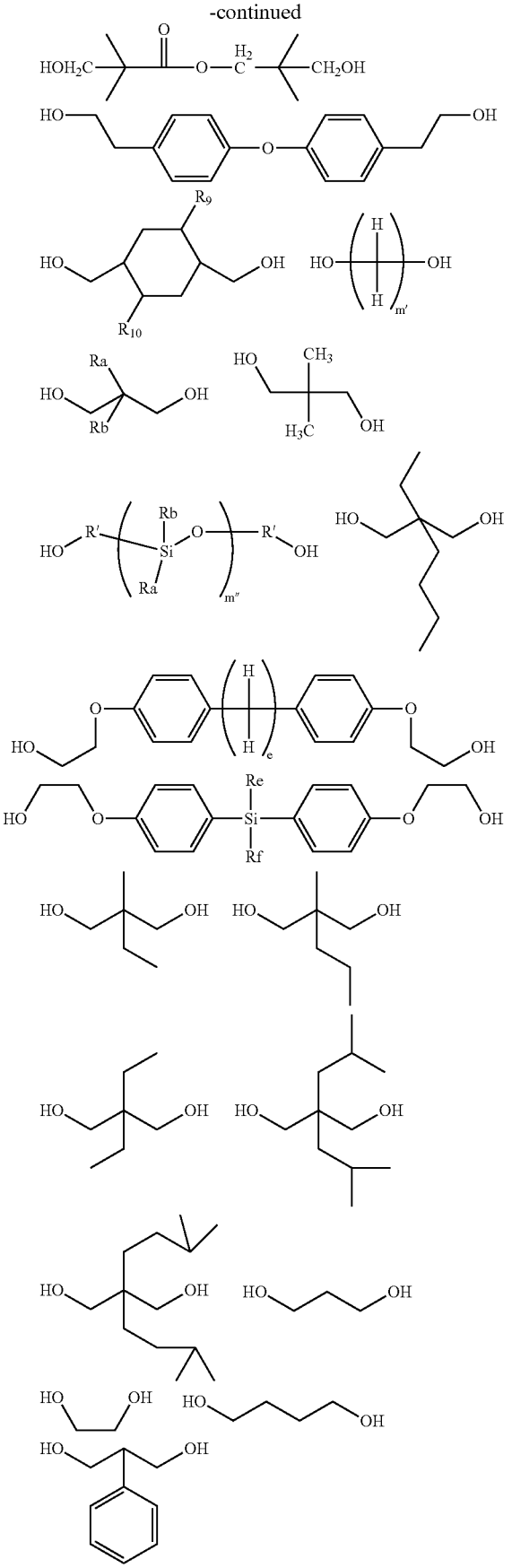

<Secondary Diol Compound>

[Chemical Formula 21]

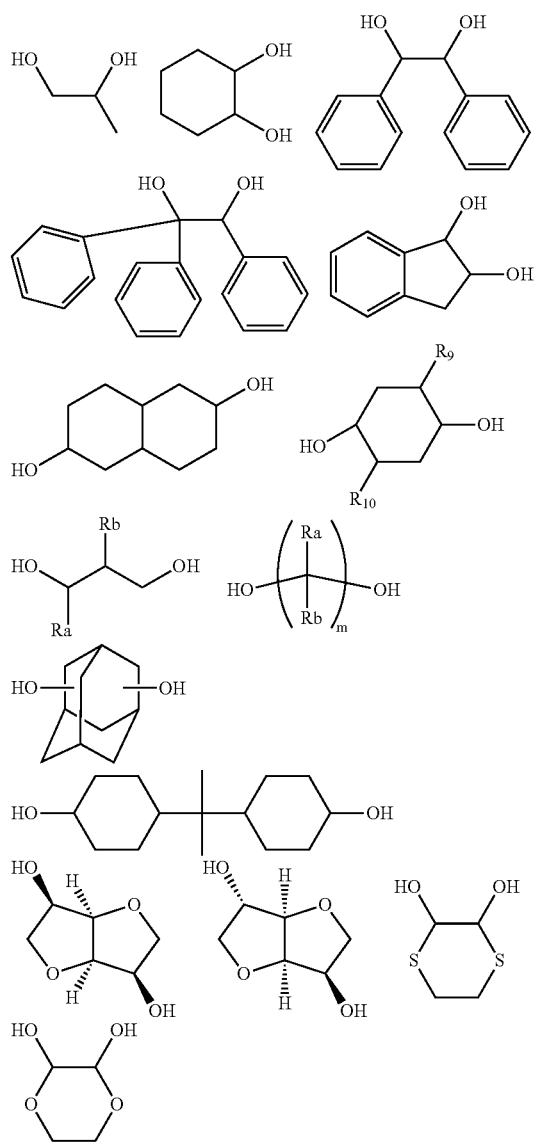

More specific examples of the aliphatic diol compound which can be used in the present invention may include an aliphatic diol that contains a cyclic structure such as 1,4-cyclohexane diol, 1,4-cyclohexanedimethanol, 1,6-cyclohexanedimethanol, tricyclo[5.2.1.0$^{2.6}$]decanedimethanol, decalin-2,6-dimethanol, pentacyclopentadecanedimethanol, isosorbide, isomannide, 1,3-adamantanedimethanol and the like; an aliphatic diol that contains an aromatic ring such as p-xylylene glycol, m-xylylene glycol, naphthalenedimethanol, biphenyldimethanol, 1,4-bis(2-hydroxyethoxy)phenyl, 4,4'-bis(2-hydroxyethoxy)biphenyl, 2,2'-bis[(2-hydroxyethoxy)phenyl]propane, 9,9-bis[4-(2-hydroxyethoxyl)phenyl]fluorene (BPEF), 9,9-bis(hydroxymethyl)fluorene, 9,9-bis(hydroxyethyl)fluorene, fluorene glycol, fluorene diethanol and the like; an aliphatic polyester diol such as polycaprolactone diol, poly(1,4-butanediol adipate)diol, poly(1,4-butanediol succinate)diol and the like; a branched state aliphatic diol such as 2-butyl-2-ethylpropane-1,3-diol (butylethylpropane glycol), 2,2-diethylpropane-1,3-diol, 2,2-diisobutylpropane-1,3-diol, 2-ethyl-2-methylpropane-1,3-diol, 2-methyl-2-propylpropane-1,3-diol, 2-methyl-propane-1,3-diol, propane-1,2-diol, etc.; a carbonate diol type compound such as bis(3-hydroxy-2,2-dimethylpropyl) carbonate and the like.

The aliphatic diol compound may be used alone or in combination of two or more kinds. Incidentally, the actually used aliphatic diol compound may be optionally selected depending on the reaction conditions to be employed or the like, since the kind of the usable compound may vary depending on the reaction conditions or the like.

In addition, in consideration of distilling off the aromatic monohydroxy compound by-produced accompanied by the reaction of the aromatic polycarbonate prepolymer and the aliphatic diol compound, the aliphatic diol compound to be used is preferably a compound having a higher boiling point than that of the aromatic monohydroxy compound, similarly in the trifunctional or more of the aliphatic polyol compound. In addition, it is necessary to fix (to promote the reaction certainly) the reaction under a constant temperature and pressure, so that it is desired to use the aliphatic diol compound having a higher boiling point. Thus, the aliphatic diol compound to be used in the present invention may specifically include those having a boiling point of 240° C. or higher, preferably 250° C. or higher.

On the other hand, the lower limit of the boiling point of the aliphatic diol compound to be used in the present invention is not particularly limited, and in consideration of distilling off the aromatic monohydroxy compound by-produced accompanied by the reaction of the aromatic polycarbonate prepolymer and the aliphatic diol compound, the aliphatic diol compound to be used is preferably a compound having a higher boiling point than that of the aromatic monohydroxy compound. Also, it is necessary to promote the reaction certainly without volatilization under a certain temperature and pressure.

More preferred specific examples of the aliphatic diol compound may include 1,4-cyclohexanedimethanol, 1,6-cyclohexanedimethanol (boiling point; 283° C.), decalin-2,6-dimethanol (boiling point; 341° C.), pentacyclopentadecanedimethanol, 1,3-adamantanedimethanol, tricyclo[5.2.1.0$^{2.6}$]decanedimethanol, 4,4'-bis(2-hydroxyethoxy)biphenyl, 2,2'-bis[(2-hydroxyethoxy)phenyl]propane, 9,9-bis[4-(2-hydroxyethoxyl)phenyl]fluorene (BPEF), 9,9-bis(hydroxymethyl)fluorene, 9,9-bis(hydroxyethyl)fluorene, fluorene glycol, fluorene diethanol, 2-butyl-2-ethylpropane-1,3-diol (boiling point; 271° C.), 2,2-diethylpropane-1,3-diol (boiling point; 250° C.), 2,2-diisobutylpropane-1,3-diol (boiling point; 280° C.), bis(3-hydroxy-2,2-dimethylpropyl) carbonate, 2-ethyl-2-methylpropane-1,3-diol (boiling point; 226° C.), 2-methyl-2-propylpropane-1,3-diol (boiling point; 230° C.), propane-1,2-diol (boiling point; 188° C.) and the like.

Particularly preferred specific examples of the aliphatic diol compound may be selected from the group consisting of pentacyclopentadecane-dimethanol, 1,4-cyclohexanedimethanol, 1,3-adamantanedimethanol, decalin-2,6-dimethanol, tricyclo[5.2.1.0$^{2.6}$]decanedimethanol, 2-butyl-2-ethylpropane-1,3-diol, 2,2-diisobutylpropane-1,3-diol, 2-ethyl-2-methylpropane-1,3-diol, 2,2-diethylpropane-1,3-diol and 2-methyl-2-propylpropane-1,3-diol.

The upper limit of the boiling point of the linking agent (trifunctional or more of the aliphatic polyol compound and optionally including the aliphatic diol compound) to be used in the present invention is not particularly limited, and it is sufficient with 500° C. or lower. Also, according to the method of the present invention, even when a relatively low boiling point linking agent is used, it can be made to be contributed to the linking and molecular weight-increasing reaction with good efficiency without causing lowering in an addition ratio (a fixation ratio). Thus, as the linking agent to be used in the present invention, a relatively low boiling point material having a boiling point of 350° C. or lower may be further used. Thus, according to the method of the present invention, even when the linking agent having a relatively low boiling point is used, volatilization can be suppressed to the minimum, and a merit that it is not necessary to use the material in excess can be obtained in some cases, so that it is economically advantageous in the case of continuous production on an industrial scale.

<3> Amount of Linking Agent to be Used

An amount of the linking agent containing the trifunctional or more of the aliphatic polyol compound to be used in the present invention is preferably 0.01 mol to 1.0 mol based on the whole terminal group amount of the aromatic polycarbonate prepolymer as 1 mol, more preferably 0.05 mol to 1.0 mol, further preferably 0.1 mol to 0.9 mol, particularly preferably 0.2 mol to 0.7 mol, most preferably 0.4 mol to 0.7 mol.

When the amount of the linking agent to be used is the upper limit value or lower of the range, occurrence of an inserting reaction in which the linking agent is inserted into the main chain of the branched aromatic polycarbonate resin as a copolymer component can be suppressed, and increase in a ratio of the copolymer is suppressed whereby an effect of the copolymer on the physical property is small. Accordingly, it is possible to achieve an improvement of the physical property sufficiently, and it is preferred as an effect of increasing the molecular weight of the aromatic polycarbonate prepolymer.

On the other hand, when an amount of the linking agent to be used is the lower limit value or more in the range, sufficient increase in the molecular weight can be accomplished. Also, when the branched polycarbonate prepolymer is used, sufficient increase in the molecular weight can be accomplished, and as a result, sufficient correlation is established between the total amount of the branching agent and the aliphatic polyol compound to be used and the branching degree of the obtained high molecular weight branched aromatic polycarbonate resin.

According to the method of the present invention, when the amount of the linking agent to be used is within the range, good correlation can be found out between the amount of the linking agent to be used and the molecular weight (reaching molecular weight) of the obtainable branched aromatic polycarbonate resin. Therefore, by changing the amount of the linking agent to be used, reaching molecular weight can be controlled, whereby it is easy to obtain a high molecular weight branched aromatic polycarbonate resin having a desired molecular weight. Such a correlation can be found when the linking agent is used with a ratio within the range, and there is good correlation when the molecular weight of the obtained high molecular weight branched aromatic polycarbonate resin is in the range of 50,000 to 60,000.

In the specification of the present application, "the whole terminal group amount of the polycarbonate" or "the whole terminal group amount of the polymer" means, for example, a number of the terminal group per one molecule is 2 in the case of the polycarbonate (or chain state polymer) having no branch, so that when an amount of the polycarbonate having no branch is 0.5 mol, then the whole terminal group amount is calculated to be 1 mol. In the case of the polycarbonate having a branch, the terminal group of the molecular chain is also contained in the whole terminal group amount. Such a total terminal amount including the branched chain terminal group can be calculated from the measurement by $^1$H-NMR or calculation from the molecular weight and an amount of the branching agent to be used or the like.

In the present invention, a chlorine amount, a nitrogen amount, an alkali metal amount or a heavy metal amount contained in the linking agent to be used as impurities is preferably low. The alkali metal means sodium, potassium and a salt or a derivative thereof, and the heavy metal specifically refers to iron, nickel, chromium and the like.

The contents of these impurities are preferably 1,000 ppm or less as chlorine, 100 ppm or less as nitrogen, 10 ppm or less as the alkali metal, and among the heavy metals, 3 ppm or less as iron, 2 ppm or less as nickel, and 1 ppm or less as chromium.

A ratio of the trifunctional or more of the aliphatic polyol compound in the linking agent to be used in the present invention is not particularly limited, and may be optionally selected so that a resin having a desired branching degree can be obtained depending on the uses. The upper limit of the ratio of the trifunctional or more of the aliphatic polyol compound can be made 100 mol % (the trifunctional or more of the aliphatic polyol compound alone is used).

On the other hand, when the trifunctional or more of the aliphatic polyol compound and the above-mentioned aliphatic diol compound are used in combination, the lower limit of the ratio of the trifunctional or more of the aliphatic polyol compound is 5 mol % or more, preferably 10 mol % or more, more preferably 20 mol % or more, further preferably 30 mol %, particularly preferably 40 mol % or more based on the whole amount (100 mol %) of the linking agent. Also, the upper limit of the ratio of the trifunctional or more of the aliphatic polyol compound is 80 mol % or less, preferably 70 mol % or less, more preferably 60 mol % or less based on the whole amount of the linking agent.

Also, a ratio of the trifunctional or more of the aliphatic polyol compound is preferably 5 mol % to 100 mol %, more preferably 30 mol % to 70 mol % or 90 mol % to 100 mol %, further preferably 40 mol % to 60 mol % or 95 mol % to 100 mol % based on the whole amount of the linking agent.

(3) Transesterification Reaction with Linking Agent

In the present invention, the aromatic polycarbonate prepolymer and the linking agent including the trifunctional or more of the aliphatic polyol compound are subjected to transesterification reaction in the presence of the transesterification catalyst under reduced pressure conditions. As the transesterification catalyst to be used in the transesterification reaction, a usual basic compound catalyst to be used as the catalyst for producing the polycarbonate or other transesterification catalysts can be used.

The transesterification catalyst may not be newly added at the time of the transesterification of the aromatic polycarbonate prepolymer and the linking agent when the transesterification catalyst used at the time of producing the aromatic polycarbonate prepolymer is not deactivated.

The basic compound catalyst may particularly include an alkali metal compound and/or an alkaline earth metal compound, a nitrogen-containing compound and the like.

As the alkali metal compound and/or the alkaline earth metal compound, an organic acid salt, an inorganic salt, an oxide, a hydroxide, a hydride, an alkoxide or the like, of the alkali metal and the alkaline earth metal are preferably used. As the nitrogen-containing compound, quaternary ammonium hydroxide and a salt thereof, an amine or the like are preferably used. These compounds may be used alone or in combination.

Specific examples of the alkali metal compound to be used may include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium borophenylate, sodium benzoate, potassium benzoate, cesium benzoate, lithium benzoate, disodium hydrogen phosphate, dipotassium hydrogen phosphate, dilithium hydrogen phosphate, disodium phenyl phosphate, disodium salt, dipotassium salt, dicesium salt or dilithium salt of bisphenol A, a sodium salt, a potassium salt, a cesium salt or a lithium salt of phenol and the like.

Specific examples of the alkaline earth metal compound to be used may include magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate, magnesium phenylphosphate and the like.

Specific examples of the nitrogen-containing compound to be used may include a quaternary ammonium hydroxide having an alkyl group and/or an aryl group and the like, such as tetramethyl ammonium hydroxide, tetraethyl ammonium hydroxide, tetrapropyl ammonium hydroxide, tetrabutyl ammonium hydroxide, trimethylbenzyl ammonium hydroxide and the like; a tertiary amine such as triethylamine, dimethylbenzylamine, triphenylamine and the like; a secondary amine such as diethylamine, dibutylamine and the like; a primary amine such as propylamine, butylamine and the like; an imidazole such as 2-methylimidazole, 2-phenylimidazole, benzoimidazole and the like; a base or a basic salt such as ammonia, tetramethylammonium borohydride, tetrabutylammonium borohydride, tetrabutylammonium tetraphenylborate, tetraphenylammonium tetraphenylborate and the like.

Other transesterification catalysts may preferably include a salt of zinc, tin, zirconium or lead, and these may be used alone or in combination.

Other transesterification catalysts to be used may specifically include zinc acetate, zinc benzoate, zinc 2-ethylhexanoate, tin(II) chloride, tin(IV) chloride, tin(II) acetate, tin(IV) acetate, dibutyltin dilaurate, dibutyltin oxide, dibutyltin dimethoxide, zirconium acetylacetonate, zirconium oxyacetate, zirconium tetrabutoxide, lead(II) acetate, lead (IV) acetate and the like.

These catalysts are used with a ratio of $1 \times 10^{-9}$ mol to $1 \times 10^{-3}$ mol, preferably a ratio of $1 \times 10^{-7}$ mol to $1 \times 10^{-5}$ mol based on the total 1 mol of the dihydroxy compound constituting the branched aromatic polycarbonate resin.

A reaction temperature in the molecular weight-increasing reaction (linking reaction) by the above-mentioned linking agent is preferably in the range of 240° C. to 320° C., further preferably 260° C. to 310° C., particularly preferably 270° C. to 300° C.

Also, the pressure is preferably 13 kPa (100 torr) or lower, further preferably 1.3 kPa (10 torr) or lower. The pressure is preferably 0.01 kPa to 13 kPa (0.1 torr to 100 torr), more preferably 0.013 kPa to 0.67 kPa (0.1 torr to 5 torr). When the linking and highly-polymerizing reaction is carried out under normal pressure, molecular weight decreasing of polymer might be induced.

By the use of these linking agents, the weight average molecular weight (Mw) of the branched aromatic polycarbonate resin is preferably increased 5,000 or more than the weight average molecular weight (Mw) of the aromatic polycarbonate prepolymer, more preferably increased 10,000 or more, further preferably increased 15,000 or more.

The weight average molecular weight (Mw) of the branched aromatic polycarbonate resin in the present invention is not particularly limited, and is preferably 36,000 to 100,000, more preferably 36,000 to 80,000, and most preferably 40,000 to 80,000.

Evaluation of the branching degree of the branched aromatic polycarbonate resin in the present invention is represented by the structural viscosity index, an N value. The N value of the branched aromatic polycarbonate resin obtained by the producing method of the present invention is preferably more than 1.25, more preferably more than 1.25 and 2.2 or less, further preferably more than 1.25 and 2.0 or less, particularly preferably 1.30 or more and 1.9 or less.

In general, the linear aromatic polycarbonate obtained by the interfacial polymerization method shows the N value of 1.1 to 1.4, and a high molecular weight product of the aromatic polycarbonate obtained by the melt polymerization method shows the N value of 1.3 to 2.0 without using the branching agent due to lowering in quality by heat deterioration in the producing process or the like. The N value in this case is not a controlled N value, and varies by a degree of deterioration of the resin in the producing process of the melt polymerization method so that it is difficult to control. However, in the present invention, the N value of the branched aromatic polycarbonate resin obtained in the case of using a branched polycarbonate prepolymer as the aromatic polycarbonate prepolymer is almost in a proportional relation with a combined amount of an amount of the branching agent to be used at the time of producing the branched polycarbonate prepolymer and an amount of the trifunctional or more of the aliphatic polyol compound to be used at the linking reaction, more specifically it has the correlation shown by the following numerical formula (II).

$$N = K_1 A + K_2 \quad \text{(II)}$$

In the above-mentioned numerical Formula (II), N represents an N value (structural viscosity index) of a branched aromatic polycarbonate resin, A represents a total amount to be used (Unit: mol %) of an amount of the branching agent to be used at the production of the prepolymer and an amount of the trifunctional or more of the aliphatic polyol compound to be used in the linking agent. $K_1$ is a constant (no unit) of 0.1 to 2.0, preferably 0.3 to 1.6, and $K_2$ is a constant (no unit) of 1.05 to 1.5, preferably 1.1 to 1.4.

Incidentally, A in the numerical formula (II) is mol % based on the whole polyol (including diol) used in the producing process of the present invention, more specifically it is "(the total amount to be used of the amount of the branching agent to be used at the time of producing the prepolymer and the amount of the trifunctional or more of the aliphatic polyol compound to be used in the linking agent)÷(the total amount to be used of the amount of the branching agent to be used at the time of producing the prepolymer and the amount of the linking agent to be used+the amount of the aromatic dihydroxy compound to be used)×100".

Thus, according to the method of the present invention, the total amount to be used of the branching agent to be used at the time of producing the branched polycarbonate prepolymer and the aliphatic polyol compound in the linking agent, and the branching degree (N value) show a certain correlation, so that the branching degree of the branched aromatic polycarbonate resin can be controlled by the total used amount of the branching agent and the aliphatic polyol compound.

More specifically, according to the method of the present invention, the branching degree (N value) of the obtained branched aromatic polycarbonate resin is preferably made a value exceeding 1.25, more preferably in the range of more than 1.25 and 2.2 or less, further preferably in the range of more than 1.25 and 2.0 or less, and particularly preferably in the range of 1.3 or more and 1.9 or less, it can be controlled to the intended value.

Evaluation of hue of the aromatic polycarbonate is generally represented by a YI value. In general, the YI value of the branched aromatic polycarbonate resin obtained from the interfacial polymerization method is shown by 0.8 to 1.0. On the other hand, a high molecular weight product of the aromatic polycarbonate obtained by the melt polymerization method generally shows the YI value of 1.7 to 2.0 due to lowering in quality accompanied by the producing process. However, the YI value of the branched aromatic polycarbonate resin obtained by the producing method of the present invention shows the equal YI value as that of the aromatic polycarbonate obtained by the interfacial polymerization method, and no worsening in the hue was observed.

A kind of the apparatus or a material of the reactor in the molecular weight-increasing reaction (transesterification reaction) may be used any conventionally known materials, and the reaction may be carried out in a continuous system or a batch system. The reaction apparatus to be used for carrying out the reaction may be a vertical type equipped with an anchor type stirring blade, a Maxblend stirring blade, a Helical ribbon type stirring blade or the like, a horizontal type equipped with a paddle blade, a lattice blade, a spectacle-shaped blade or the like, or an extruder type equipped with a screw, and may be a reaction apparatus in which the above apparatuses are optionally combined by taking the viscosity of the polymerized product in consideration. It is preferably a horizontal type, having a screw with good stirring efficiency, and having a unit which can make the system reduced pressure conditions.

It is further preferably and suitably used a twin-screw extruder type having a polymer seal and vent structure or a horizontal type reactor.

As the material of the apparatus, a material which does not affect to the color tone of the polymer including a stainless such as SUS310, SUS316 and SUS304, or nickel, iron nitride and the like is preferred. Also, at the inside of the apparatus (the part contacting with the polymer), buff processing or electrolytic polishing processing may be applied, or a metal plating treatment by chromium, etc., may be carried out.

In the present invention, a deactivating agent of the catalyst may be added to the branched aromatic polycarbonate resin the molecular weight of which has been increased by the molecular weight-increasing reaction. In general, a method of subjecting to deactivation of the catalyst by addition of the conventionally known acidic substance has suitably been carried out. These substances suitably used may specifically include an aromatic sulfonic acid such as p-toluenesulfonic acid, an aromatic sulfonic acid ester such as butyl p-toluenesulfonate and the like, an organic halide such as stearic acid chloride, butyric acid chloride, benzoyl chloride and p-toluenesulfonic acid chloride, an alkyl sulfuric acid ester such as dimethyl sulfate, an organic halide such as benzyl chloride and the like.

After deactivation of the catalyst, it may provide a process of degassing and removing the low boiling point compound in the branched aromatic polycarbonate resin at a pressure of 0.013 kPa to 0.13 kPa (0.1 torr to 1 torr) and a temperature of 200 to 350° C., and for this purpose, a horizontal apparatus equipped with a stirring blade excellent in surface renewability such as a paddle blade, a lattice blade, a spectacle-shaped blade or the like, or a thin film evaporator is suitably used.

Further, a heat stabilizer, an antioxidant, a pigment, a dye reinforcing agent, a filler, a UV absorber, a lubricant, a mold releasing agent, a crystal nucleating agent, a plasticizer, a fluidity improving agent, an antistatic agent and the like may be added to the branched aromatic polycarbonate resin.

These additives can be added by the conventionally known method and each component can be mixed with the branched aromatic polycarbonate resin. For example, there may be optionally employed a method in which each component is dispersed and mixed by a high speed mixer represented by a tumble mixer, a Henschel mixer, a ribbon blender and a super mixer, and then, melt-kneading by an extruder, a Banbury mixer, a roller and the like.

The branched aromatic polycarbonate resin disclosed by the present invention is particularly suitable for a large-sized extrusion molding or various kinds of blow molding and the like and can be preferably utilized for the uses such as various molding products, sheets, films and the like. When the resin is used for these uses, the branched aromatic polycarbonate resin obtained by the present invention may be used alone or may be a blended product with the other polymer. A processing such as a hard coating and laminate may be preferably used depending on the uses.

Specific examples of the molded products may include optical components such as a head lamp lens of a vehicle, a lens body of a camera and the like, optical device component such as a siren light cover, an illumination lamp cover and the like, a substitute of a window glass for vehicles such as a train, an automobile and the like, a substitute of a domestic window glass, a lighting part such as a sunshine roof, a roof of a greenhouse and the like, goggles and sun glasses, a lens or a chassis of glasses, a chassis of OA equipment such as a copying machine, facsimile, personal computer and the like, a chassis of home appliance such as television, microwave oven and the like, electronic component applications such as a connector, an IC tray and the like, a protective equipment such as a helmet, a protector, a protective surface and the like, a tableware such as a tray and the like, and medical goods such as an artificial dialysis case, a denture and the like, but are not limited by these.

EXAMPLES

In the following, the present invention is explained by referring to Examples, but the present invention is not limited by these Examples. The measured values in the Examples were measured by the following methods or devices. Also, in the following Examples, 2,2-bis(4-hydroxyphenyl)propane may be sometimes abbreviated to as "BPA", diphenylcarbonate as "DPC", trimethylolpropane as "TMP", and 2-butyl-2-ethylpropane-1,3-diol as "BEPG".

1) Weight average molecular weight (Mw) in terms of polystyrene: By using GPC, a calibration curve was prepared by using standard polystyrenes ("PStQuick MP-M" manufactured by Tosoh Corporation) with known molecular weight (molecular weight distribution=1) and chloroform as an eluent. From the measured standard polystyrenes, a dissolution time and a molecular weight value of each peak were plotted, and approximation by a cubic equation was carried out to make it a calibration curve. The weight average molecular weight (Mw) and the number average molecular weight (Mn) were obtained from the following calculation formula.

$$Mw = \Sigma(W_i \times M_i) \div \Sigma(W_i)$$

$$Mn = \Sigma(N_i \times M_i) \div \Sigma(N_i) \qquad \text{[Calculation formula]}$$

Here, i represents an $i^{th}$ separation point when the molecular weight M is divided, $W_i$ represents an $i^{th}$ weight, $N_i$ represents an $i^{th}$ molecular number, $M_i$ represents an $i^{th}$ molecular weight. Also, the molecular weight M represents the molecular weight value of the polystyrene at the same dissolution time of the calibration curve.

[Measurement Conditions]
Device; HLC-8320GPC manufactured by Tosoh Corporation
Column; Guard column: TSK guard column Super MPHZ-M×1
Analysis column: TSK gel Super Multipore HZ-M×3
Solvent; HPLC grade chloroform
Injection amount; 10 μL
Sample concentration; 0.2 w/v % HPLC grade chloroform solution
Solvent flow rate; 0.35 ml/min
Measurement temperature; 40° C.
Detector; RI 2) Whole terminal group amount (molar number) of the polymer: 0.05 g of a resin sample was dissolved in 1 ml of deuterium-substituted chloroform, and the whole terminal group amount was measured by using a nuclear magnetic resonance analyzer $^1$H-NMR ("LA-500", trade name, manufactured by JEOL Ltd.) at 23° C., and shown by a molar number per a unit of BPA.

More specifically, 0.05 g of a resin sample was dissolved in 1 ml of deuterium-substituted chloroform (containing 0.05 w/v % TMS), $^1$H-NMR spectrum thereof was measured at 23° C., and a terminal phenyl group amount and a terminal phenyl group concentration of PP were measured from an integral proportion of the terminal phenyl group at around 7.4 ppm and the phenylene group (derived from BPA skeletal structure) at around 7.0 to 7.3 ppm.

That is, the terminal phenyl group concentration (terminal Ph concentration; mol %) was obtained from the analytical result of $^1$H-NMR by the following numerical formula.

[Numerical Formula 1]

Ph terminal amount (mol %) =

$$\frac{\text{(H peak area ratio of terminal-Ph-} / 2)}{\left(\begin{array}{c}\text{H peak area ratio of terminal-Ph-} / 2 + \\ \text{H peak area ratio of -Ph-} / 8\end{array}\right)} \times 100$$

The measurement conditions of $^1$H-NMR are as follows.
Device: LA-500 (500 MHz) manufactured by JEOL Ltd.
Observed nucleus: $^1$H
Relaxation delay: 1 s
x_angle: 45 deg
x_90_width: 20 μs
x_plus: 10 μs
Scan: 500 times 3) Concentration of terminal hydroxy group (ppm): In a methylene chloride solution, it was measured by UV/visible spectroscopy (546 nm) of a complex formed by the polymer and titanium tetrachloride. Or else, it was measured by observing the terminal hydroxy group by $^1$H-NMR.

The concentration of terminal hydroxy group in the prepolymer (PP) and the molecular weight-increased polycarbonate (PC) by $^1$H-NMR was measured by dissolving 0.05 g of the resin sample in 1 ml of deuterium-substituted chloroform (containing 0.05 w/v % TMS) at 23° C. More specifically, terminal hydroxy group concentrations (OH concentration) in the PP and the molecular weight-increased PC were calculated from an integral proportion of the peak of the hydroxy group at 4.7 ppm and the phenyl and phenylene group (terminal phenyl group and phenylene group derived from BPA skeletal structure) at around 7.0 to 7.5 ppm.

The measurement conditions of $^1$H-NMR are as follows.
Device: LA-500 (500 MHz) manufactured by JEOL Ltd.
Observed nucleus: $^1$H
Relaxation delay: 1 s
x_angle: 45 deg
x_90_width: 20 μs
x_plus: 10 μs
Scan: 500 times 4) N value: As an analytical device, by using a Koka-type flow tester CFT-500D (manufactured by Shimadzu Corporation), with regard to an aromatic polycarbonate (sample) dried at 130° C. for 5 hours, a melt flow volume Q160 value per a unit time measured at 280° C. and a load of 160 kg, and a melt flow volume Q10 value per a unit time measured similarly at 280° C. and a load of 10 kg were used and the value was obtained by the following formula. Q is a flow amount (ml/sec) of the melt resin.

$$N \text{ value}=(\log(Q160 \text{ value})-\log(Q10 \text{ value}))/(\log 160-\log 10)$$

Example 1

In 300 cc of a four-necked flask equipped with a stirrer and a distillation apparatus were charged 45.5 g (0.20 mol) of BPA, 48.0 g (0.22 mol) of DPC and 0.5 μmol/mol (which means "0.5 μmol based on 1 mol of BPA") of cesium carbonate as a catalyst, and the mixture was heated to 180° C. under nitrogen atmosphere and stirred for 5 minutes.

Thereafter, the pressure was adjusted to 27 kPa (200 torr) and simultaneously the temperature of the mixture was raised to 205° C. for 35 minutes. Thereafter, the mixture was maintained at 27 kPa (200 torr) and at 205° C. for 15 minutes to carry out transesterification reaction. Further, the temperature of the mixture was raised to 215° C. for 10 minutes, and the pressure was adjusted to 24 kPa (180 torr). At 215° C., the pressure was maintained to 24 kPa (180 torr) for 10 minutes, subsequently, the temperature of the mixture was raised to 235° C. for 10 minutes, and the pressure was adjusted to 20 kPa (150 torr). Moreover, the temperature of the mixture was raised to 260° C. for 10 minutes, and simultaneously the pressure was adjusted to 133 Pa (1 torr) or lower for 1 hour. At 260° C., the pressure was maintained to 133 Pa (1 torr) or lower for 60 minutes, then, the obtained resin was taken out to obtain 50 g of the aromatic polycarbonate prepolymer (hereinafter sometimes abbreviated to as "PP") having a weight average molecular weight (Mw) of 22,000. This product is a linear polycarbonate prepolymer.

Among the obtained aromatic polycarbonate prepolymer, 30 g thereof was charged in a 300 cc four-necked flask equipped with a stirrer and a distillation device, and melted at 280° C. Subsequently, 0.100 g (0.000745 mol) of TMP and 0.090 g (0.000564 mol) of BEPG were charged therein, and the resulting mixture was stirred at normal pressure for 15 minutes, and the pressure was adjusted to 133 Pa (1.0 torr) for 15 minutes. Subsequently, the mixture was stirred and kneaded for 45 minutes. The phenol distilled out from the reaction system was condensed by the cooling tube, and removed from the reaction system. As a result, the weight average molecular weight (Mw) of the obtained aromatic polycarbonate resin was 55,000. Physical properties, etc., of the obtained polymer are shown in Table 1.

Example 2

In 300 cc of a four-necked flask equipped with a stirrer and a distillation apparatus were charged 45.5 g (0.20 mol) of BPA, 48.1 g (0.22 mol) of DPC, 0.05 g (0.000373 mol) of TMP and 0.5 μmol/mol (which means "0.5 μmol based on 1 mol of BPA") of cesium carbonate as a catalyst, and the mixture was heated to 180° C. under nitrogen atmosphere and stirred for 5 minutes.

Thereafter, the pressure was adjusted to 27 kPa (200 torr) and simultaneously the temperature of the mixture was raised to 205° C. for 35 minutes. Thereafter, the mixture was maintained at 27 kPa (200 torr) and at 205° C. for 15 minutes to carry out transesterification reaction. Further, the temperature of the mixture was raised to 215° C. for 10 minutes, and the pressure was adjusted to 24 kPa (180 torr). At 215° C., the pressure was maintained to 24 kPa (180 torr) for 10 minutes, subsequently, the temperature of the mixture was raised to 235° C. for 10 minutes, and the pressure was adjusted to 20 kPa (150 torr). Moreover, the temperature of the mixture was raised to 260° C. for 10 minutes, and simultaneously the pressure was adjusted to 133 Pa (1 torr) or lower for 1 hour. At 260° C., the pressure was maintained to 133 Pa (1 torr) or lower for 60 minutes, then, the obtained resin was taken out to obtain 50 g of the aromatic polycarbonate prepolymer having a weight average molecular weight (Mw) of 23,000. This product is a branched polycarbonate prepolymer.

Among the obtained aromatic polycarbonate prepolymer, 30 g thereof was charged in a 300 cc four-necked flask equipped with a stirrer and a distillation device, and melted at 280° C. Subsequently, 0.071 g (0.000529 mol) of TMP and 0.127 g (0.000794 mol) of BEPG were charged therein, and the resulting mixture was stirred at normal pressure for 15 minutes, and the pressure was adjusted to 133 Pa (1.0 torr) for 15 minutes. Subsequently, the mixture was stirred and kneaded for 45 minutes. The phenol distilled out from the reaction system was condensed by the cooling tube, and removed from the reaction system. As a result, the weight average molecular weight (Mw) of the obtained aromatic polycarbonate resin was 50,000. Physical properties of the obtained polymer are shown in Table 1.

Example 3

In 300 cc of a four-necked flask equipped with a stirrer and a distillation apparatus were charged 45.5 g (0.20 mol) of BPA, 48.0 g (0.22 mol) of DPC and 1.0 μmol/mol (which means "1.0 μmol based on 1 mol of BPA") of sodium hydrogen carbonate as a catalyst, and the mixture was heated to 180° C. under nitrogen atmosphere and stirred for 5 minutes.

Thereafter, the pressure was adjusted to 27 kPa (200 torr) and simultaneously the temperature of the mixture was raised to 205° C. for 35 minutes. Thereafter, the mixture was maintained at 27 kPa (200 torr) and at 205° C. for 15 minutes to carry out transesterification reaction. Further, the temperature of the mixture was raised to 215° C. for 10 minutes, and the pressure reduction degree was adjusted to 24 kPa (180 torr). At 215° C., the pressure was maintained to 24 kPa (180 torr) for 10 minutes, subsequently, the temperature of the mixture was raised to 235° C. for 10 minutes, and the pressure was adjusted to 20 kPa (150 torr). Moreover, the temperature of the mixture was raised to 260° C. for 10 minutes, and simultaneously the pressure was adjusted to 133 Pa (1 torr) or lower for 1 hour. At 270° C., the pressure was maintained to 133 Pa (1 torr) or lower for 70 minutes, then, the obtained resin was taken out to obtain 50 g of the aromatic polycarbonate prepolymer having a weight average molecular weight (Mw) of 31,000.

Among the obtained aromatic polycarbonate prepolymer, 30 g thereof was charged in a 300 cc four-necked flask equipped with a stirrer and a distillation device, and melted at 280° C. Subsequently, 0.126 g (0.000941 mol) of TMP was charged therein, and the resulting mixture was stirred at normal pressure for 15 minutes, and the pressure was adjusted to 133 Pa (1.0 torr) for 15 minutes. Subsequently, the mixture was stirred and kneaded for 45 minutes. The phenol distilled out from the reaction system was condensed by the cooling tube, and removed from the reaction system. As a result, the weight average molecular weight (Mw) of the obtained aromatic polycarbonate resin was 60,000. Physical properties of the obtained polymer are shown in Table 1.

Comparative Example 1

In 300 cc of a four-necked flask equipped with a stirrer and a distillation apparatus were charged 45.5 g (0.20 mol) of BPA, 48.0 g (0.22 mol) of DPC and 1.0 μmol/mol (which means "1.0 μmol based on 1 mol of BPA") of sodium hydrogen carbonate as a catalyst, and the mixture was heated to 180° C. under nitrogen atmosphere and stirred for 5 minutes.

Thereafter, the pressure reduction degree was adjusted to 27 kPa (200 torr) and simultaneously the temperature of the mixture was raised to 205° C. for 35 minutes. Thereafter, the mixture was maintained at 27 kPa (200 torr) and at 205° C. for 15 minutes to carry out transesterification reaction. Further, the temperature of the mixture was raised to 215° C. for 10 minutes, and the pressure reduction degree was adjusted to 24 kPa (180 torr). At 215° C., the pressure reduction degree was maintained to 24 kPa (180 torr) for 10 minutes, subsequently, the temperature of the mixture was raised to 235° C. for 10 minutes, and the pressure reduction degree was adjusted to 20 kPa (150 torr). Moreover, the temperature of the mixture was raised to 260° C. for 10 minutes, and simultaneously the pressure reduction degree was adjusted to 133 Pa (1 torr) or lower for 1 hour. At 270° C., the pressure reduction degree was maintained to 133 Pa (1 torr) or lower for 70 minutes, then, the obtained resin was taken out to obtain 50 g of the aromatic polycarbonate prepolymer having a weight average molecular weight (Mw) of 31,000.

Among the obtained aromatic polycarbonate prepolymer, 30 g thereof was charged in a 300 cc four-necked flask equipped with a stirrer and a distillation device, and melted at 280° C. Subsequently, 0.288 g (0.000940 mol) of THPE (1,1,1-tris(4-hydroxyphenyl)ethane) was charged therein, and the resulting mixture was stirred at normal pressure for 15 minutes, and the pressure was adjusted to 133 Pa (1.0 torr) for 15 minutes. Subsequently, the mixture was stirred and kneaded for 45 minutes. The phenol distilled out from the reaction system was condensed by the cooling tube, and removed from the reaction system. As a result, the weight average molecular weight (Mw) of the obtained aromatic polycarbonate resin was 34,000. Physical properties of the obtained polymer are shown in Table 1.

TABLE 1

| | | Example 1 | Example 2 | Example 3 | Comparative example |
|---|---|---|---|---|---|
| Preparation of prepolymer | BPA (g) | 45.5 | 45.4 | 45.5 | 45.5 |
| | DPC (g) | 48.0 | 48.1 | 48.0 | 48.0 |
| | BPA (mol) | 0.20 | 0.20 | 0.20 | 0.20 |
| | DPC (mol) | 0.22 | 0.22 | 0.22 | 0.22 |
| | TMP (g) | — | 0.05 | — | — |
| | TMP (mol) | — | 0.000373 | — | — |
| | DPC/Diol (BPA + TMP) Molar ratio | 1.12 | 1.13 | 1.12 | 1.12 |
| | Catalyst | 0.5 μmol - $Cs_2CO_3$/BPA | 0.5 μmol - $Cs_2CO_3$/BPA | 1.0 μmol/mol $NaHCO_3$/BPA | 1.0 μmol/mol $NaHCO_3$/BPA |
| | Prepolymer molecular weight (Mw) | 22000 | 23000 | 31000 | 31000 |
| | Prepolymer molecular weight (Mn) | 11000 | 11000 | 14000 | 14000 |
| | OH concentration (ppm) | 60 | 50 | 200 | 200 |
| | Total terminal amount (mol %/BPA unit) | 5.21 | 5.21 | 4.70 | 4.70 |
| Transesterification reaction with linking agent | Prepolymer (g) | 30.0 | 30.0 | 30.0 | 30.0 |
| | Linking agent: TMP (g) | 0.100 | 0.071 | 0.126 | — |
| | Linking agent: TMP (mol) | 0.000745 | 0.000529 | 0.000941 | — |
| | Linking agent: THPE (g) | — | — | — | 0.288 |

TABLE 1-continued

|  |  | Example 1 | Example 2 | Example 3 | Comparative example |
|---|---|---|---|---|---|
|  | Linking agent: THPE (mol) | — | — | — | 0.000940 |
|  | Linking agent: BEPG (g) | 0.090 | 0.127 | — | — |
|  | Linking agent: BEPG (mol) | 0.000564 | 0.000794 | — | — |
| Obtained polycarbonate | Polyfunctional compound added ratio (%) | 0.69 | 0.68 | 0.87 | 0.87 |
|  | Molecular weight (Mw) | 55000 | 50000 | 60000 | 34000 |
|  | N value | 1.50 | 1.45 | 1.65 | 1.24 |

Each symbol in the above Table 1 show the following.
BPA: 2,2-bis(4-hydroxyphenyl)propane
DPC: diphenylcarbonate
TMP: trimethylolpropane
THPE: 1,1,1-tris(4-hydroxyphenyl)ethane
BEPG: 2-butyl-2-ethylpropane-1,3-diol In the above Table 1, "polyfunctional compound added ratio" means an added ratio of the trifunctional or more of the polyfunctional compound. More specifically, polyfunctional compound added ratio (%) is shown as "(a total amount to be used of an amount of the branching agent used at the time of producing the prepolymer to be used and an amount of the trifunctional or more of the polyol compound in the linking agent to be used)÷(an amount of the branching agent used at the time of producing the prepolymer to be used+a total amount of the linking agent to be used+an amount of the aromatic dihydroxy compound to be used)× 100". The terms "a total amount of the linking agent to be used" means a total used amount of the trifunctional or more of the polyol compound used as the linking agent and an amount of the other polyol compounds used as the linking agent.

Incidentally, in Examples 1 to 3, TMP was used as the branching agent at the time of producing the prepolymer, TMP which is the trifunctional or more of the aliphatic polyol compound was used as the linking agent, BEPG which is the other polyol compound (aliphatic diol compound) was used as the linking agent, and BPA was used as the aromatic dihydroxy compound. In Comparative example 1, THPE which is trifunctional or more of the aromatic polyol compound was used as the linking agent. BPA was used as the aromatic dihydroxy compound.

The disclosure of Japanese Patent Application No. 2012-178101 is herein incorporated in its entirety into the present specification by reference.

All publications, patent applications, and technical standards mentioned in the present specification are herein incorporated by reference to the same extent as if such individual publication, patent application, or technical standard was specifically and individually indicated to be incorporated by reference.

INDUSTRIAL APPLICABILITY

According to the present invention, it is possible to produce a branched aromatic polycarbonate resin having a good hue, high quality and high molecular weight by using a general branching agent under mild conditions and a short processing time.

Also, according to the process of the present invention, it has been found out that there is a correlation between the amount of the linking agent to be used and the molecular weight (reaching molecular weight) of the obtained branched aromatic polycarbonate resin. According to this, it is possible to control the reaching molecular weight by changing the amount of the linking agent to be used.

Moreover, it is possible to produce a branched aromatic polycarbonate resin which is controlled to an optional branched-structure amount (N value) by using a branched polycarbonate prepolymer into which a predetermined amount of the branched structure has been introduced as the aromatic polycarbonate prepolymer.

The high molecular weight branched aromatic polycarbonate resin thus obtained can be suitably used particularly for the uses of large capacity hollow molded articles, large-sized extrusion molding products, blow molding products, etc.

The invention claimed is:

1. A method for producing a branched aromatic polycarbonate resin that comprises
subjecting an aromatic polycarbonate prepolymer and a linking agent containing a trifunctional or more of an aliphatic polyol compound to transesterification reaction in the presence of a transesterification catalyst under a reduced pressure condition;
wherein the aromatic polycarbonate prepolymer has a weight average molecular weight (Mw) of 20,000 to 60,000 and
wherein a concentration of the terminal hydroxy group of the aromatic polycarbonate prepolymer is 1,500 ppm or less.

2. The method for producing according to claim 1, wherein the branched aromatic polycarbonate resin has an N value (structural viscosity index) represented by the following numerical formula (I) of exceeding 1.25:

$$N \text{ value} = (\log(Q160 \text{ value}) - \log(Q10 \text{ value}))/(\log 160 - \log 10) \quad (I)$$

in the numerical formula (I), Q160 value represents a melt flow volume (ml/sec) per a unit time measured at 280° C. and a load of 160 kg, and Q10 value represents a melt flow volume (ml/sec) per a unit time measured at 280° C. and a load of 10 kg.

3. The method for producing according to claim 1, wherein the aromatic polycarbonate prepolymer is a linear polycarbonate prepolymer having an N value (structural viscosity index) of 1.25 or less.

4. The method for producing according to claim 1, wherein the aromatic polycarbonate prepolymer is a branched chain polycarbonate prepolymer into which a branched structure has been introduced therein using a branching agent.

5. The method for producing according to claim 4, wherein the N value is adjusted within the predetermined range based on a correlation between a total amount (A) to be used of an amount of the branching agent to be used and an amount of the trifunctional or more of the aliphatic polyol compound to be used, and a branching degree uses an N value (structural viscosity index) of the branched aromatic polycarbonate resin as an index, by adjusting the total amount (A) to be used.

6. The method for producing according to claim 5, wherein the total amount (A) to be used and the N value (structural viscosity index) have a correlation satisfying the following numerical formula (II):

$$N \text{ value} = K_1 A + K_2 \quad (II)$$

in the numerical formula (II), $K_1$ is a constant of 0.1 to 2.0, and $K_2$ is a constant of 1.05 to 1.5.

7. The method for producing according to claim 1, wherein the trifunctional or more of the aliphatic polyol compound is trimethylolpropane.

8. The method for producing according to claim 1, wherein a ratio of the trifunctional or more of the aliphatic polyol compound in the linking agent is 5 mol % to 100 mol %.

9. The method for producing according to claim 1, wherein an amount of the linking agent to be added is 0.01 mol to 1.0 mol based on a total terminal amount of the aromatic polycarbonate prepolymer as 1 mol.

10. The method for producing according to claim 1, wherein a weight average molecular weight (Mw) of the branched aromatic polycarbonate is 5,000 or more larger than a weight average molecular weight (Mw) of the aromatic polycarbonate prepolymer.

11. The method for producing according to claim 1, wherein the transesterification reaction is carried out at a temperature of 240° C. to 320° C.

12. The method for producing according to claim 1, wherein the transesterification reaction is carried out under a reduced pressure condition of 0.01 kPa (0.1 torr) to 13 kPa (100 torr).

13. A branched aromatic polycarbonate resin having an N value (structural viscosity index) of exceeding 1.25 obtained by the method for producing according to claim 1.

14. The branched aromatic polycarbonate resin according to claim 13, having a weight average molecular weight (Mw) of 36,000 to 100,000.

* * * * *